United States Patent
Mehrle

(10) Patent No.: US 8,102,413 B2
(45) Date of Patent: Jan. 24, 2012

(54) STEREOSCOPIC IMAGING APPARATUS INCORPORATING A PARALLAX BARRIER

(75) Inventor: Michael Mehrle, Los Angeles, CA (US)

(73) Assignee: Unipixel Displays, Inc., The Woodlands, TX (US)

( * ) Notice: Subject to any disclaimer, the term of this patent is extended or adjusted under 35 U.S.C. 154(b) by 1399 days.

(21) Appl. No.: 11/611,727

(22) Filed: Dec. 15, 2006

(65) Prior Publication Data
US 2007/0165305 A1    Jul. 19, 2007

Related U.S. Application Data

(60) Provisional application No. 60/750,882, filed on Dec. 15, 2005.

(51) Int. Cl.
*H04N 3/00* (2006.01)
*H04N 9/47* (2006.01)
(52) U.S. Cl. ................ 348/42; 348/58; 348/59
(58) Field of Classification Search .......... None
See application file for complete search history.

(56) References Cited

U.S. PATENT DOCUMENTS

| | | | |
|---|---|---|---|
| 4,692,792 A | 9/1987 | Street | |
| 5,751,384 A | 5/1998 | Sharp | |
| 5,831,765 A | 11/1998 | Nakayama et al. | |
| 6,252,707 B1 * | 6/2001 | Kleinberger et al. | 359/465 |
| 6,392,690 B1 * | 5/2002 | Fujii et al. | 348/59 |
| 7,154,653 B2 * | 12/2006 | Kean et al. | 359/232 |
| 7,190,318 B2 * | 3/2007 | Cohen | 343/773 |
| 2004/0165263 A1 * | 8/2004 | Sudo et al. | 359/462 |

FOREIGN PATENT DOCUMENTS

| | | |
|---|---|---|
| GB | 2405545 | 3/2005 |
| WO | WO 90/13848 | 11/1990 |

OTHER PUBLICATIONS

International Search Report for International application No. PCT/US2006/048153, dated Oct. 4, 2007.

* cited by examiner

*Primary Examiner* — John B. Walsh
(74) *Attorney, Agent, or Firm* — Conley Rose, P.C.

(57) ABSTRACT

An apparatus is disclosed for providing a stereoscopic image for viewing by a viewer, with improved resolution. The apparatus includes a generally planar display comprising a two-dimensional array of uniformly spaced pixels, and it further includes a generally planar parallax barrier having an area substantially coextensive with the display and spaced a prescribed uniform distance from the display. The pixel array includes a first set of sub-pixels controllable to project light in a first spectral color, a second set of sub-pixels controllable to project light in a second spectral color, and a third set of sub-pixels controllable to project light in a third spectral color, and the parallax barrier includes a repeating pattern of vertically oriented regions configured to transmit light to the viewer's first eye along light paths defined from only the first set of sub-pixels and to transmit light to the viewer's second eye along light paths defined from only the second and third sets of sub-pixels.

24 Claims, 24 Drawing Sheets

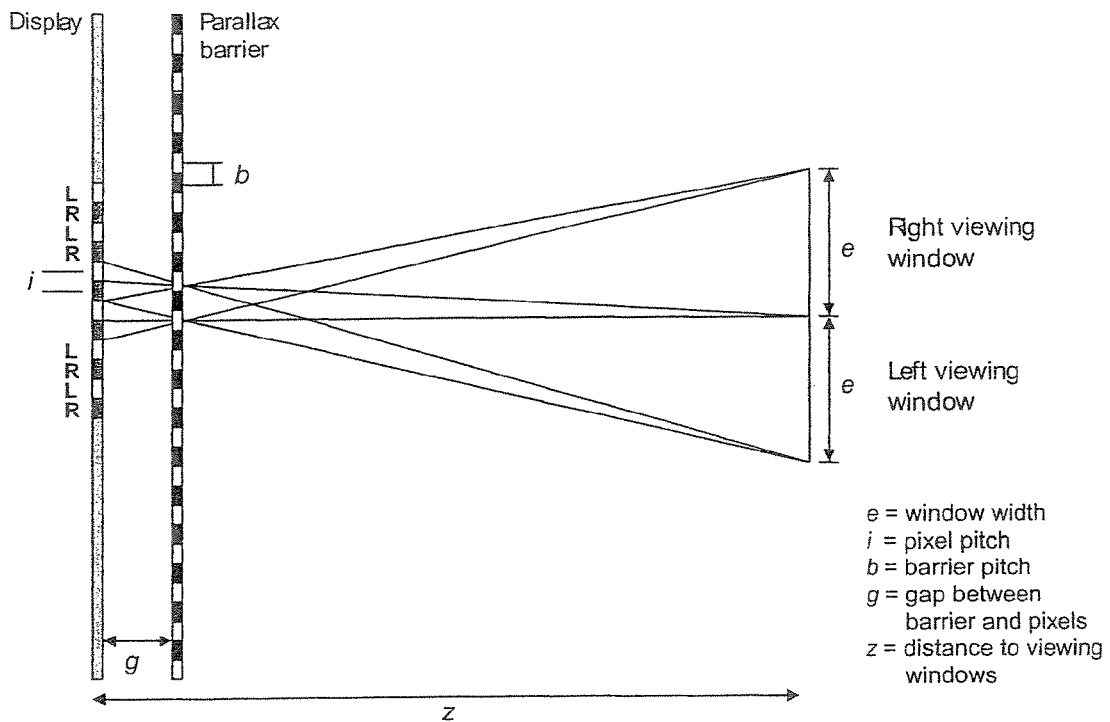
Fig. 2 Basic monochromatic two-view parallax barrier.
(Prior Art)
$e$ = window width
$i$ = pixel pitch
$b$ = barrier pitch
$g$ = gap between barrier and pixels
$z$ = distance to viewing windows
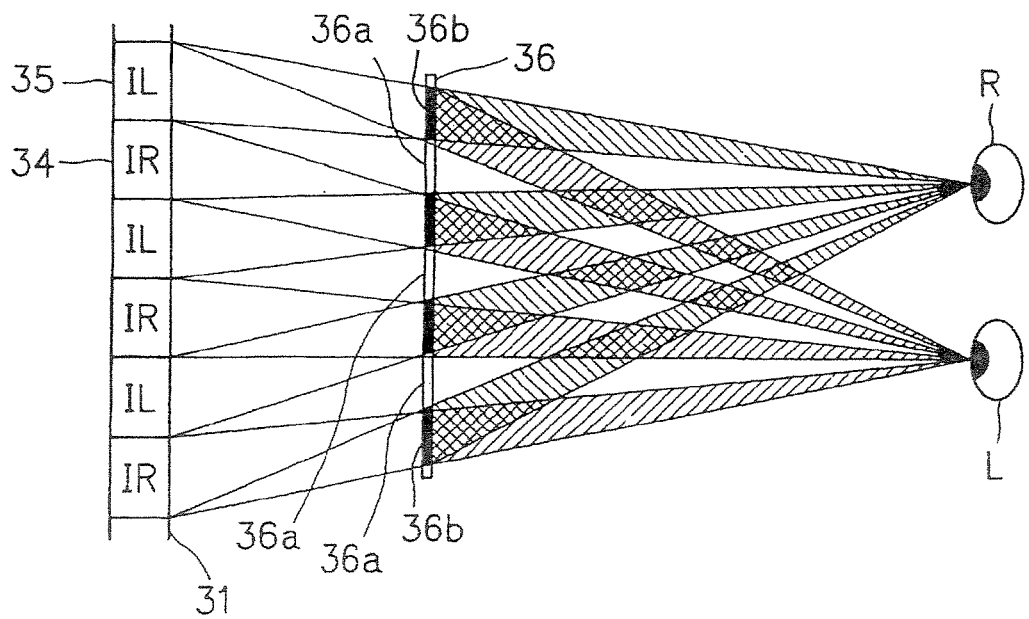
FIG. 3 Prior art: traditional parallax barrier

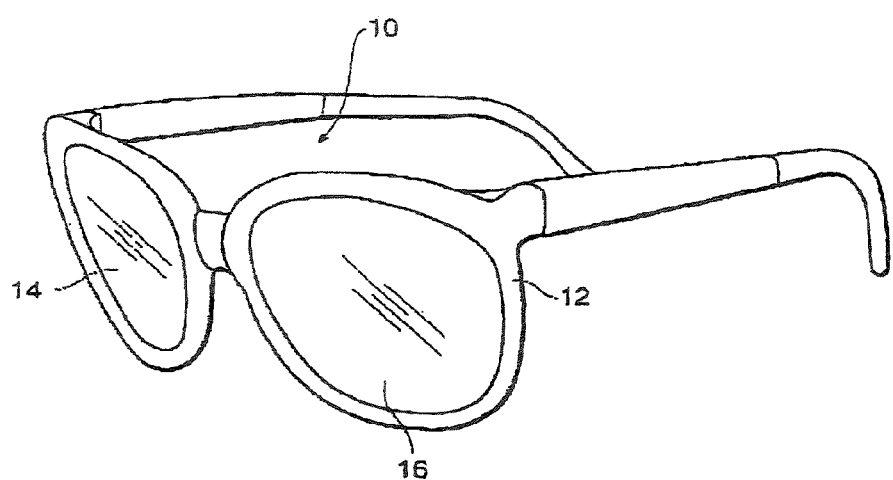
Fig. 4 Prior art: anaglyphic gel spectacles

STEREOSCOPIC IMAGING APPARATUS INCORPORATING A PARALLAX BARRIER

CROSS-REFERENCE TO RELATED APPLICATION

Priority is claimed from provisional Application No. 60/750,882, filed Dec. 15, 2005, which is incorporated herein by reference.

BACKGROUND OF THE INVENTION

1. Field of the Invention

The present invention relates in general to auto-stereoscopic viewing systems for use in conjunction with flat panel displays. More particularly, the invention relates to a system for viewing anaglyphic imagery without the use of spectacles, which can be used concurrently by one or more viewers to experience the perception of depth.

2. Description of the Prior Art

Existing stereoscopic display systems using binocular parallax information are mainly categorized into two groups. In the first group, stereoscopic vision is achieved using a pair of special spectacles, e.g., polarizing spectacles, LC shutter spectacles, or anaglyphic spectacles, whereas in the second group, stereoscopic vision is achieved using a specific optical member, e.g., a lenticular lens or parallax barrier, arranged in front of a display or inside a display. In the second group, an observer can observe stereoscopic still or motion pictures without the need for special spectacles.

An anaglyph is a composite image that includes a pair of images taken from two slightly different angles. One of each pair of images is filtered to remove one of the three primary colors (e.g., red), and the other of each pair of images is filtered to remove the opposite two of the three primary colors (e.g., both green and blue). The two filtered images are superimposed on each other, and they are viewed with a red filter over one eye and a complementary-colored filter, either blue or green, over the other eye. This filtration causes a vectoring of discrete image information to go to each eye and pass into the visual center of the brain, for processing into a virtual stereoscopic image.

The use of color filters in the form of 'anaglyph' spectacles is well known in the art of stereoscopy and represents one of the most common examples of the use of spectacles to see stereoscopically. Two images of a stereo pair are typically combined into one single image; one of the images is generally red in color, and the other generally blue or green. The viewer then wears filter spectacles, such that one eye will see the red image and the other the blue or green image. If these images are appropriate right and left images, then three-dimensional stereoscopic vision results.

This traditional arrangement has the inherent disadvantage that the use of a single filter color for each eye causes the perceived image, although three-dimensional, to have very little, if any, residual color information. It sometimes is possible to see some color on traditional anaglyph images; however, the amount of color is severely limited and the perceived images are largely seen as being monochromatic.

In recent years, full color anaglyphic images have been realized through the use of red/cyan spectacles. One of the images is red in color (as in the traditional arrangement), but the other image includes both blue and green. According to commonly accepted theories of additive color synthesis, mixing the primary colors blue and green will create the color cyan. Similarly, a cyan gel filter will transmit mainly the blue and green spectrum of visible light, while blocking most of the red spectrum. This effect is being exploited in modern anaglyphic arrangements by allowing a vectoring of discrete image information to go to each eye and pass into the visual center of the brain, for processing into a virtual stereoscopic full-color image.

Both traditional and modern full-color anaglyphic arrangements have the disadvantage of requiring the use of special spectacles. In most cases, simple filters are placed in front of the viewer's eyes, or paper-framed spectacles are placed over the viewer's prescription spectacles. This has the unintended consequence of causing a subtle negative focus shift, in effect, introducing the symptoms of far-sightedness. Particularly in the case of a computer screen, at less than a meter normal spacing, the viewer typically experiences eyestrain when using gel filter spectacles. In fact, the red-filtered image is noticeably out of focus in most cases, due to the focus accommodation limits of all but the most youthful viewers. Plastic-mounted filters have the same poor performance as paper-framed spectacles.

Another inherent disadvantage of anaglyphic spectacles is that color gel filters are incapable of separating the two images perfectly, thus producing "crosstalk," which has the appearance of ghost images in the scene. The main advantage of these spectacles is that they are inexpensive and even can be constructed at home using the appropriate color filters. Further, the art of creating anaglyphic images is widely known and quite simple, and it is even possible to produce anaglyphs from conventional two-dimensional images by adding depth cues with any modern paint program.

The symptoms arising from the use of conventional anaglyph viewing filters are numerous and well known. In many cases, after a short period of time, the use of anaglyph lenses can cause fatigue and, in some cases, even dizziness. Sometimes, users of these filters who view an anaglyph will complain of optical distortion. Some viewers also will complain of discomfort from the use of anaglyph gel filters. These complaints have caused this type of stereographic technology to be considered by many as second rate, despite its ease of use.

Anaglyphic stereoscopic viewing is a technology that has been in use for well over 100 years. For some of that time, particularly in the 1950's and early 1960's, in the United States, anaglyphic viewing for purposes of amusement, such as in books and movie theaters, had become quite popular. In these anaglyph stereoscopic viewing media, the conventional red and blue filters were mounted in a frame for wearing as a pair of spectacles. The viewer could then view the anaglyph to perceive a three dimensional image. However, the technology of anaglyph viewing has not really been advanced beyond the stage of amusement and novelty-type viewing. Recent attempts to encourage the use of anaglyphic spectacles in the viewing of cinematographic projections have proven unsuccessful. The benefits of stereoscopic viewing apparently are insufficient to overcome the drawbacks of distortion and the inconvenience of wearing anaglyphic filters.

The use of anaglyphic gel spectacles to view anaglyphic images or prints, therefore, has generally been limited to novelty items, largely due to optical distortions, poor optical quality, and poor color rendition. However, it has been recognized that, if the limitations of anaglyphic spectacles could be overcome, anaglyphic imagery could be elevated from a novelty item to a very useful art with numerous scientific and commercial applications.

It should, therefore, be appreciated that there remains a need for a system for anaglyic stereoscopic viewing that avoids the problems associated with anaglyphic gel spectacles. The present invention fulfills this need and provides further related advantages.

OBJECTS OF THE INVENTION

It is, therefore, a primary object of the present invention to provide an anaglyphic parallax barrier comprising a plurality of light-filtering regions, which is situated between the front surface of an RGB flat panel display and a viewer or, alternatively, behind such an RGB flat panel display.

It is another object of the present invention to provide systems for anaglyphic auto-stereoscopic viewing that do not require anaglyphic gel spectacles to be worn by the viewer to obtain a perception of depth.

It is a further object of the invention to provide an anaglyphic parallax barrier of the type stated that, within a defined viewing area, blocks the red sub-pixels of a common RGB flat panel display from one eye of the viewer.

It is an additional object of the invention to provide an anaglyphic parallax barrier of the type stated that, within a defined viewing area, blocks the green sub-pixels of a common RGB flat panel display from one eye of the viewer.

It is a further object of the invention to provide an anaglyphic parallax barrier of the type stated that, within a defined viewing area, blocks the blue sub-pixels of a common RGB flat panel display from one eye of the viewer.

It is another object of the present invention to provide an anaglyphic parallax barrier of the type stated that allows at least one of the three sub-pixels of each RGB pixel segment in a display area to reach one of the viewer's eyes and at least one of the two remaining sub-pixels of each such RGB pixel segment to reach the other of the viewer's eyes, thus not compromising the resolution of the perceived stereoscopic image.

It is an additional object of the invention to provide an anaglyphic parallax barrier of the type stated that is situated on one specific intersection plane among a plurality of intersection planes between the display and the viewer or, alternatively, behind the display.

It is yet another object of the invention to provide a combination of two anaglyphic parallax barriers of the type stated, wherein each barrier is situated at a separate intersection plane among a plurality of intersection planes between the display and the viewer or, alternatively, behind the display.

It is also an object of the invention to provide a system for anaglyphic stereoscopic viewing having substantially no focal distortion, thereby reducing eye strain.

With the above and other objects in view, the invention resides in the novel features of form, construction, arrangement, and combination of components described below.

SUMMARY OF THE INVENTION

The present invention is embodied in an improved apparatus for providing a stereoscopic image for viewing by a viewer having two eyes, without the need for special spectacles. More particularly, the apparatus comprises (1) a generally planar display that includes a two-dimensional array of uniformly spaced pixels and (2) a generally planar parallax barrier having an area substantially coextensive with the display and spaced a prescribed uniform distance from the display. The display pixels include a first set of sub-pixels controllable to project light in a first spectral color, a second set of sub-pixels controllable to project light in a second spectral color, and a third set of sub-pixels controllable to project light in a third spectral color. The parallax barrier includes a repeating pattern of vertically oriented regions configured to transmit light to the viewer's first eye along light paths defined from only the first set of sub-pixels and to transmit light to the viewer's second eye along light paths defined from only the second and third sets of sub-pixels.

In a more detailed feature of the invention, the light paths defined between the display's first set of sub-pixels and the viewer's first eye cross the light paths defined between the display's second and third sets of sub-pixels and the viewer's second eye, thereby defining a succession of intersection planes spaced from the display, each successive intersection plane being located a predetermined, substantially uniform distance from the display. The repeating pattern of vertically oriented regions of the parallax barrier is located substantially at one or more of the intersection planes selected from the succession of intersection planes other than those whose sequential positions from the display are divisible by three.

In one group of embodiments of the invention, the repeating pattern of vertically oriented regions of the parallax barrier is located at just one of the successive intersection planes, situated between the display and the viewer. In these embodiments, the parallax barrier includes a repeating pattern of three vertically oriented regions.

If the parallax barrier is located at the first intersection plane, the repeating pattern of three vertically oriented regions includes (1) first regions configured to transmit light from the first set of sub-pixels to the viewer's first eye and to transmit light from the third set of sub-pixels to the viewer's second eye; (2) second regions configured to block light transmission from the second set of sub-pixels to the viewer's first eye and to block light transmission from the first set of sub-pixels to the viewer's second eye; and (3) third regions configured to block light transmission from the third set of sub-pixels to the viewer's first eye and to transmit light from the second set of sub-pixels to the viewer's second eye.

Alternatively, if the parallax barrier is located at the second intersection plane, its repeating pattern of three vertically oriented regions includes (1) first regions configured to transmit light from the first set of sub-pixels to the viewer's first eye and to transmit light from the second set of sub-pixels to the viewer's second eye; (2) second regions configured to block light transmission from the second set of sub-pixels to the viewer's first eye and to transmit light from the third set of sub-pixels to the viewer's second eye; and (3) third regions configured to block light transmission from the third set of sub-pixels to the viewer's first eye and to block light transmission from the first set of sub-pixels to the viewer's second eye.

Further, if the parallax barrier is located at the fourth intersection plane, its repeating pattern of three vertically oriented regions includes (1) first regions configured to transmit light from the first set of sub-pixels to the viewer's first eye and to transmit light from the third set of sub-pixels to the viewer's second eye; (2) second regions configured to block light transmission from the second set of sub-pixels to the viewer's first eye and to block light transmission from the first set of sub-pixels to the viewer's second eye; and (3) third regions configured to block light transmission from the third set of sub-pixels to the viewer's first eye and to transmit light from the second set of sub-pixels to the viewer's second eye.

In all of these embodiments, the parallax barrier can optionally further include narrow black separation bars between predetermined regions of the vertically oriented regions, to reduce cross-over of light between the first, second, and third sets of sub-pixels.

In another group of embodiments of the invention, the repeating pattern of vertically oriented regions of the parallax barrier is located at just one of the successive intersection planes, situated on the side of the display opposite the viewer. In these embodiments, the display's first, second, and third sets of sub-pixels all are controllable to transmit light received from the side of the display opposite the viewer. The light paths defined between the display's first set of sub-pixels and the viewer's first eye cross the light paths defined between the display's second and third sub-pixels and the viewer's second eye, thereby defining a succession of intersection planes spaced from the display, each successive intersection plane being located a predetermined, substantially uniform distance from the display, on the side of the display opposite the viewer.

If the parallax barrier is located at the first intersection plane, the repeating pattern of three vertically oriented regions includes (1) first regions configured to transmit light through the first set of sub-pixels to the viewer's first eye and to transmit light through the second set of sub-pixels to the viewer's second eye; (2) second regions configured to block light transmission through the second set of sub-pixels to the viewer's first eye and to transmit light through the third set of sub-pixels to the viewer's second eye; and (3) third regions configured to block light transmission through the third set of sub-pixels to the viewer's first eye and to block light transmission through the first set of sub-pixels to the viewer's second eye.

Alternatively, if the parallax barrier is located at the second intersection plane, the repeating pattern of three vertically oriented regions includes (1) first regions configured to transmit light through the first set of sub-pixels to the viewer's first eye and to transmit light through the third set of sub-pixels to the viewer's second eye; (2) second regions configured to block light transmission through the second set of sub-pixels to the viewer's first eye and to block light transmission through the first set of sub-pixels to the viewer's second eye; and (3) third regions configured to block light transmission through the third set of sub-pixels to the viewer's first eye and to transmit light through the second set of sub-pixels to the viewer's second eye.

In another group of embodiments of the invention, the repeating pattern of vertically oriented regions of the parallax barrier is located substantially at two of the successive intersection planes. Some of these embodiments locate the parallax barrier at intersection planes between the display and the viewer, and other embodiments locate the parallax barrier on the side of the display opposite the viewer.

One embodiment locates the parallax barrier at the first and second intersection planes between the display and the viewer. In this embodiment, the first barrier is located substantially at the first intersection plane and includes (1) first vertically oriented regions configured to transmit light from the first set of sub-pixels to the viewer's first eye and to transmit light from the third set of sub-pixels to the viewer's second eye; (2) second vertically oriented regions configured to block light transmission from the second set of sub-pixels to the viewer's first eye; and (3) third vertically oriented regions configured to transmit light from the second set of sub-pixels to the viewer's second eye. In addition, the second barrier is located substantially at the second intersection plane and includes (1) first vertically oriented regions config- ured to transmit light from the first set of sub-pixels to the viewer's first eye and to transmit light from the second set of sub-pixels to the viewer's second eye; (2) second vertically oriented regions configured to transmit light from the third set of sub-pixels to the viewer's second eye; and (3) third vertically oriented regions configured to block light transmission from the third set of sub-pixels to the viewer's first eye. Further, the second vertically oriented regions of the first barrier and/or the third vertically oriented regions of the second barrier are configured to block light transmission from the first set of sub-pixels to the viewer's second eye.

Another alternative embodiment also locates the parallax barrier at the first and second intersection planes, but with a different configuration for the parallax barrier. In this embodiment, the first barrier is located substantially at the first intersection plane and includes (1) first vertically oriented regions configured to transmit light from the first set of sub-pixels to the viewer's first eye and to transmit light from the third set of sub-pixels to the viewer's second eye; (2) second vertically oriented regions configured to block light transmission from the second set of sub-pixels to the viewer's first eye and to block light transmission from the first set of sub-pixels to the viewer's second eye; and (3) third vertically oriented regions configured to block light transmission from the third set of sub-pixels to the viewer's first eye and to transmit light from the second set of sub-pixels to the viewer's second eye. In addition, the second barrier is located substantially at the second intersection plane and includes (1) first vertically oriented regions configured to transmit light from the first set of sub-pixels to the viewer's first eye and to transmit light from the second set of sub-pixels to the viewer's second eye; and (2) second vertically oriented regions configured to block light transmission from the second set of sub-pixels to the viewer's first eye and to transmit light from the third set of sub-pixels to the viewer's second eye.

Another alternative embodiment locates the parallax barrier at the second and fourth intersection planes between the display and the viewer. In this embodiment, the first barrier is located substantially at the second intersection plane and includes (1) first vertically oriented regions configured to transmit light from the first set of sub-pixels to the viewer's first eye and to transmit light from the second set of sub-pixels to the viewer's second eye; (2) second vertically oriented regions configured to transmit light from the second set of sub-pixels to the viewer's first eye and to transmit light from the third set of sub-pixels to the viewer's second eye; and (3) third vertically oriented regions configured to block light transmission from the third set of sub-pixels to the viewer's first eye. In addition, the second barrier is located substantially at the fourth intersection plane and includes (1) first vertically oriented regions configured to transmit light from the first set of sub-pixels to the viewer's first eye and to transmit light from the third set of sub-pixels to the viewer's second eye; (2) second vertically oriented regions configured to block light transmission from the second set of sub-pixels to the viewer's first eye; and (3) third vertically oriented regions configured to transmit light from the second set of sub-pixels to the viewer's second eye. Further, the third vertically oriented regions of the first barrier and/or the second vertically oriented regions of the second barrier are configured to block light transmission from the first set of sub-pixels to the viewer's second eye.

Yet another embodiment locates the parallax barrier at the first and second intersection planes on the side of the display opposite the viewer. In this embodiment, the first barrier is located substantially at the first intersection plane and includes (1) first vertically oriented regions configured to transmit light through the first set of sub-pixels to the viewer's first eye and to transmit light through the second set of sub-pixels to the viewer's second eye; (2) second vertically oriented regions configured to transmit light through the third set of sub-pixels to the viewer's second eye; and (3) third vertically oriented regions configured to block light transmission through the third set of sub-pixels to the viewer's first eye. In addition, the second barrier is located substantially at the second intersection plane and includes (1) first vertically oriented regions configured to transmit light through the first set of sub-pixels to the viewer's first eye and to transmit light through the third set of sub-pixels to the viewer's second eye; (2) second vertically oriented regions configured to block light transmission through the second set of sub-pixels to the viewer's first eye; and (3) third vertically oriented regions configured to transmit light through the second set of sub-pixels to the viewer's second eye. Further the third vertically oriented regions of the first barrier and/or the second vertically oriented regions of the second barrier are configured to block light transmission through the first set of sub-pixels to the viewer's second eye.

In another feature of the invention, applicable to the embodiments of the invention in which the parallax barrier is located on the side of the display opposite the viewer, the apparatus further comprises first and second quarter-wave films and a polarizer, situated on the side of the display opposite the viewer, for absorbing light reflected between the display and the parallax barrier.

In yet another feature of the invention, applicable to all of the embodiments in which the parallax barrier is located on the side of the display opposite the viewer, either at one or at two intersection planes, the regions of the parallax barrier configured to block light transmission in directions toward the display can optionally be configured to accomplish this blocking by reflecting light in directions away from the display.

In a separate and independent aspect of the invention, an apparatus is configured to provide a stereoscopic image for viewing by a viewer having two eyes without the need for special spectacles and with increased efficiency. More particularly, the apparatus includes a generally planar display comprising a two-dimensional array of uniformly spaced pixels and it further includes a generally planar parallax barrier having an area substantially coextensive with the display and spaced a prescribed uniform distance from the display, on the side of the display opposite the viewer. The parallax barrier includes alternating first and second vertically oriented regions. The first vertically oriented regions are configured to transmit light to the viewer's first eye along light paths defined through only a first subset of the pixels and, simultaneously, to transmit light to the viewer's second eye along light paths defined through only a second subset of pixels. The second vertically oriented regions, on the other hand, are configured to block light transmission transmit light to the viewer's second eye along light paths defined through the first subset of pixels and, simultaneously, to block light transmission to the viewer's first eye along light paths through the second subset of pixels. Further, the second vertically oriented regions of the parallax barrier effect the blockage of light transmission by reflecting light in directions away from the display.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 2 is schematic diagram depicting the basic geometry of a prior art stereoscopic viewing system incorporating a frontal parallax barrier.

FIG. 3 is a detailed diagram depicting a small segment of a prior art stereoscopic viewing system incorporating a conventional frontal parallax barrier.

FIG. 4 is a perspective view of a conventional pair of prior art anaglyphic gel spectacles.

DETAILED DESCRIPTION OF THE PREFERRED EMBODIMENTS

Definitions

Figure 1:
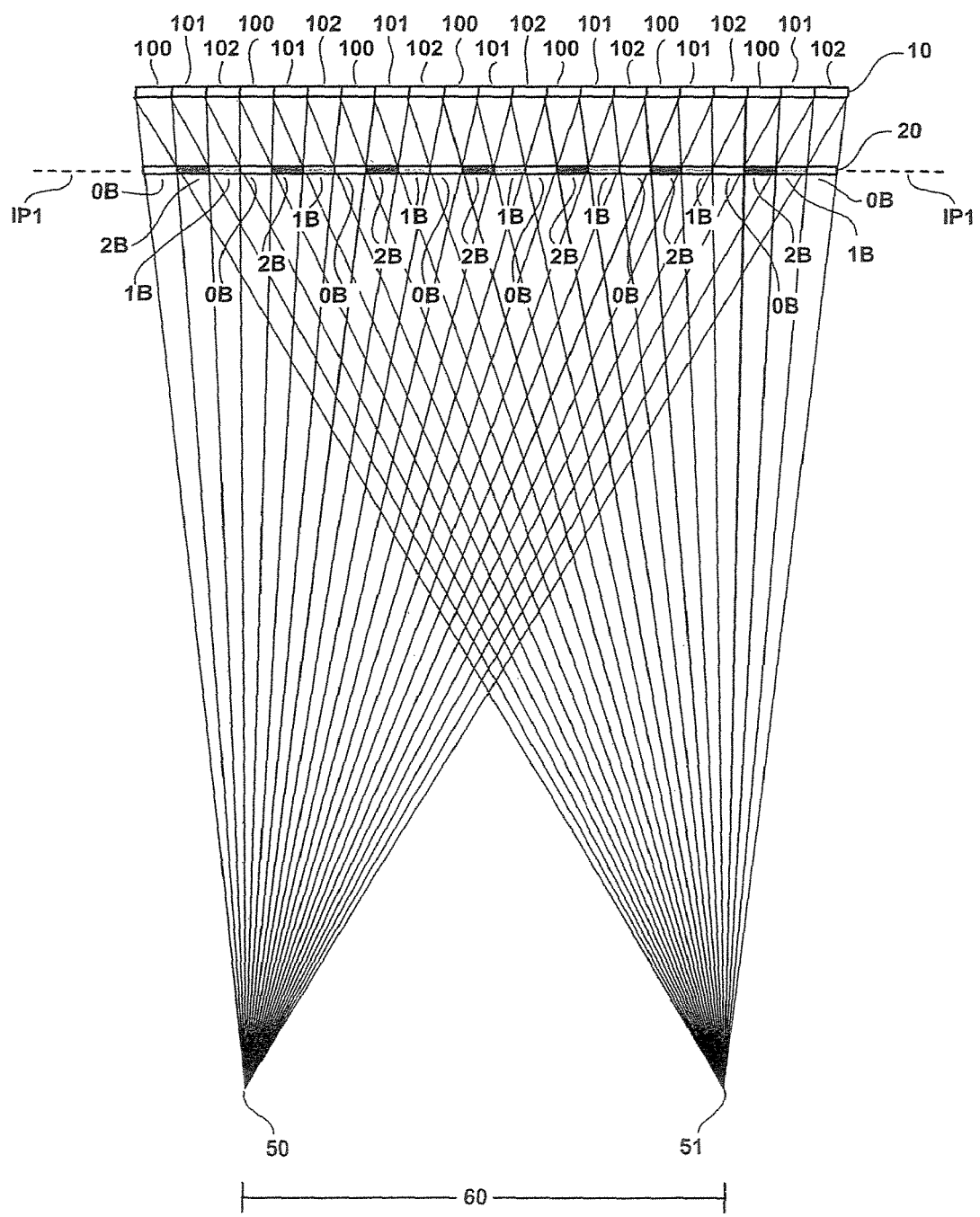
FIG. 1 is a schematic diagram depicting a system for viewing a conventional color anaglyph, in this case including a three-segment, frontal, chromatic parallax barrier (2B/1B/0B, defined below) at the first intersection plane (defined below), providing a red image to the left eye and a cyan image to the right eye.

"Light-filtering region" refers to a single stripe-shaped region placed between the viewing paths leading to two underlying sub-pixels of a commonly known RGB flat panel display. This light-filtering region is positioned such that it either transmits or blocks the view from the left eye to the sub-pixel situated to the right of the light-filtering region, and either transmits or blocks the view from the right eye to the sub-pixel situated to the left of the light-filtering region. The two underlying sub-pixels may or may not be adjacent to each other.

"2B" refers to a light-filtering region that blocks the view from the left eye to the underlying right sub-pixel while concurrently blocking the view from the right eye to the underlying left sub-pixel.

"1B" refers to a light-filtering region that either blocks the view from the left eye to the underlying right sub-pixel while concurrently permitting the view from the right eye to the underlying left sub-pixel, or that blocks the view from the right eye to the underlying left sub-pixel while permitting the view from the left eye to the underlying right sub-pixel.

"0B" refers to a light-filtering region permitting the view from the left eye to the underlying right sub-pixel while concurrently permitting the view from the right eye to the underlying left sub-pixel.

"2Bo1B" refers to an optional choice between a 2B or 1B light-filtering region.

"Intersection plane" refers to a parallel plane located a predetermined distance from the front surface of an underlying flat panel display, relative to the viewing distance from the viewer to the flat panel display. At this plane, a single light-filtering region can block the viewing path of the left eye to an underlying sub-pixel situated to the right of the light-filtering region while concurrently blocking the viewing path of the right eye to a second underlying sub-pixel situated to the left side of the light-filtering region. Many theoretical intersection planes exist between the surface of a display and a corresponding viewer. All known prior art front-surface parallax barriers are located at the first intersection plane, situated closest to the display substrate and an optional polarizer sheet; however, the consequence of this placement is that the distance between display and the viewer might become too large. Solutions to this problem are described below.

"Sub-pixel" refers to the smallest addressable unit on a display screen emitting light of a particular spectral range.

"Pixel" refers to an array of three adjacent sub-pixels, each emitting light of a different spectral range. Typically, the three spectral ranges are red, green, and blue, in what is known in the art as an RGB pixel.

"Auto-stereoscopic" refers to the faculty of presenting virtual 3D images without the need for the viewer to wear spectacles or headgear of any kind.

"2P" refers to a light-filtering region configured to prevent light from reaching the left eye through the overlying left sub-pixel while concurrently preventing light from reaching the right eye through the overlying right sub-pixel.

"1 P" refers to a light-filtering region configured either to prevent light from reaching the left eye through the overlying left sub-pixel while concurrently permitting light to reach the right eye through the overlying right sub-pixel, or to prevent light from reaching the right eye through the overlying right sub-pixel while concurrently permitting light to reach the left eye through the overlying left sub-pixel.

"0P" refers to a light-filtering region configured to permit light to reach the left eye through the overlying left sub-pixel while concurrently permitting light to reach the right eye through the overlying right sub-pixel.

"2Po1P" refers to a light-filtering region configured to optionally correspond either to a 2P light-filtering region or a 1P light-filtering region.

"2R" refers to a light-reflecting region configured to prevent light from reaching the left eye through the overlying left sub-pixel while concurrently preventing light from reaching the right eye through the overlying right sub-pixel, such prevention occurring by reflecting the light rearwardly.

"1R" refers to a light-reflecting region configured either to prevent light from reaching the left eye through the overlying left sub-pixel while concurrently permitting light to reach the right eye through the overlying right sub-pixel, or to prevent light from reaching the right eye through the overlying right sub-pixel while permitting light to reach the left eye through the overlying left sub-pixel, such prevention occurring in both cases by reflecting the light rearwardly.

"2Ro1R" refers to an optional choice between a 2R light-reflecting region or a 1R light-reflecting region.

Geometry of the Front Parallax Barrier

Typical emissive displays include pixels that diffuse radiance, i.e., that radiate light in all directions. To create a traditional twin-view, auto-stereoscopic display half, half of the pixels must radiate light only in directions seen by the left eye and the other half of the pixels must radiate light only in directions seen by the right eye. A traditional monochromatic parallax barrier is one simple structure for achieving this; it functions by blocking light using strips of black mask.

The principle of the two-view parallax barrier is illustrated in FIG. 2. The left and right images are interlaced in columns on the display, and the parallax barrier is positioned so that the left and right image pixels are blocked from view except in the region of the left and right viewing window, respectively. Although not illustrated, the viewing windows repeat in side lobes located at each side of the central viewing position. The display, therefore, can be viewed concurrently by more than one observer if the optical quality remains sufficiently high.

The pixels and parallax barrier are arranged so that the mid-point between each pair of related left and right image pixels is visible at the center of a corresponding viewing window. The geometry defining the design of the parallax barrier pitch, b, can then be determined from considering similar triangles in FIG. 2.

$$\frac{b}{z-g} = \frac{i}{z} \quad (1)$$

The equation (1) can be rearranged to give:

$$b = i\left(\frac{z-g}{z}\right) \quad (2)$$

The result equation (2) is that the required pitch for a parallax barrier providing two viewing windows is just less than the pitch of the pixels in the display. This small difference between the barrier pitch and the pixel pitch accounts for the variation in viewing angle between the eyes and the pixels across the display. It often is referred to as viewpoint correction.

Viewing distance, z, for the best quality viewing windows is another important design factor. Again, from similar triangles in FIG. 2, we can deduce a geometric relationship for this:

$$\frac{i}{g} = \frac{e}{z-g} \quad (3)$$

Equation (3) can be rearranged to yield:

$$z = g\left(\frac{e+i}{i}\right) \quad (4)$$

The window width, e, typically is set to the average eye separation, i.e., 64 mm; the pixel pitch, i, is defined by the display; and the gap, g, between display and barrier is defined by the thickness of the display's front substrate plus an optional polarizer sheet. In one example, pixel pitch, i, might be 0.1 mm, and the gap, g, including front substrate and polarizer, might be 1.15 mm, resulting in an optimal viewing distance, z, of 737 mm.

Although equations (1) through (4) assume a traditional, monochromatic, two-view, frontal parallax barrier configuration, it is important to note that the basic geometry related to all frontal parallax barrier embodiments of the present invention are identical. This means that the algebraic equations to determine the barrier pitch of all embodiments, b, as in equation (2), as well as the optimal viewing distance, z, as in equation (4), are identical.

Description of Frontal Intersection Planes

It should be noted that known systems related to single-layer monochromatic parallax barriers use only the first intersection plane. Several embodiments of the present invention, likewise, use the first intersection plane; however, the invention is not limited to such use. To properly determine the location of the first intersection plane, it is necessary to evaluate the desired average distance between the display and the viewer. From the triangle in FIG. 2, we can rearrange equation (3) to determine spacing to the first intersection plane, g, based on the distance from the display's actual sub-pixel to the viewer, z, the pixel pitch, i, and the average eye separation, e=64 mm.

$$g = i\left(\frac{z-i}{e}\right) \quad (5)$$

If, for instance, the desired viewing distance, z, is 375 mm, the pixel pitch, i, is 0.1 mm, and the average eye separation, e, is 64 mm, then according to equation (5), the theoretical distance between a traditional parallax barrier and the pixels of the display, or in other words, the first intersection plane, g, would have to situated at a distance of 0.59 mm.

It will be appreciated by those skilled in the art that traditional parallax barriers used in conjunction with commonly known liquid crystal displays (LCDs) generally assume the substrate thickness plus the thickness of any associated polarizer sheet to be the first intersection plane. It should be noted that the present invention establishes the concept of a theoretical first intersection plane, which then provides the basis of determining a plurality of additional intersection planes between the display and the viewer. Several embodiments of the invention position a parallax barrier at such additional intersection planes.

Recent glass substrates, e.g., a Corning EAGLE 2000 substrate, are available to flat panel display manufacturers in thicknesses of 0.63 mm and 0.5 mm. However, a large number of flat panel displays currently being sold still incorporate glass substrates having a thickness of 0.7 mm or more.

With reference to FIG. 2, and assuming a desired optimal viewing distance, z, of 375 mm, a sub-pixel pitch, i, of 0.1 mm, and an average eye separation, e, of 64 mm, according to equation (5) below, the combined thickness of a substrate (0.63 mm or 0.7 mm) plus the optional polarizer sheet, would exceed g, the necessary first intersection plane, which is situated at a distance of 0.59 mm from the display pixels.

Figure 5:
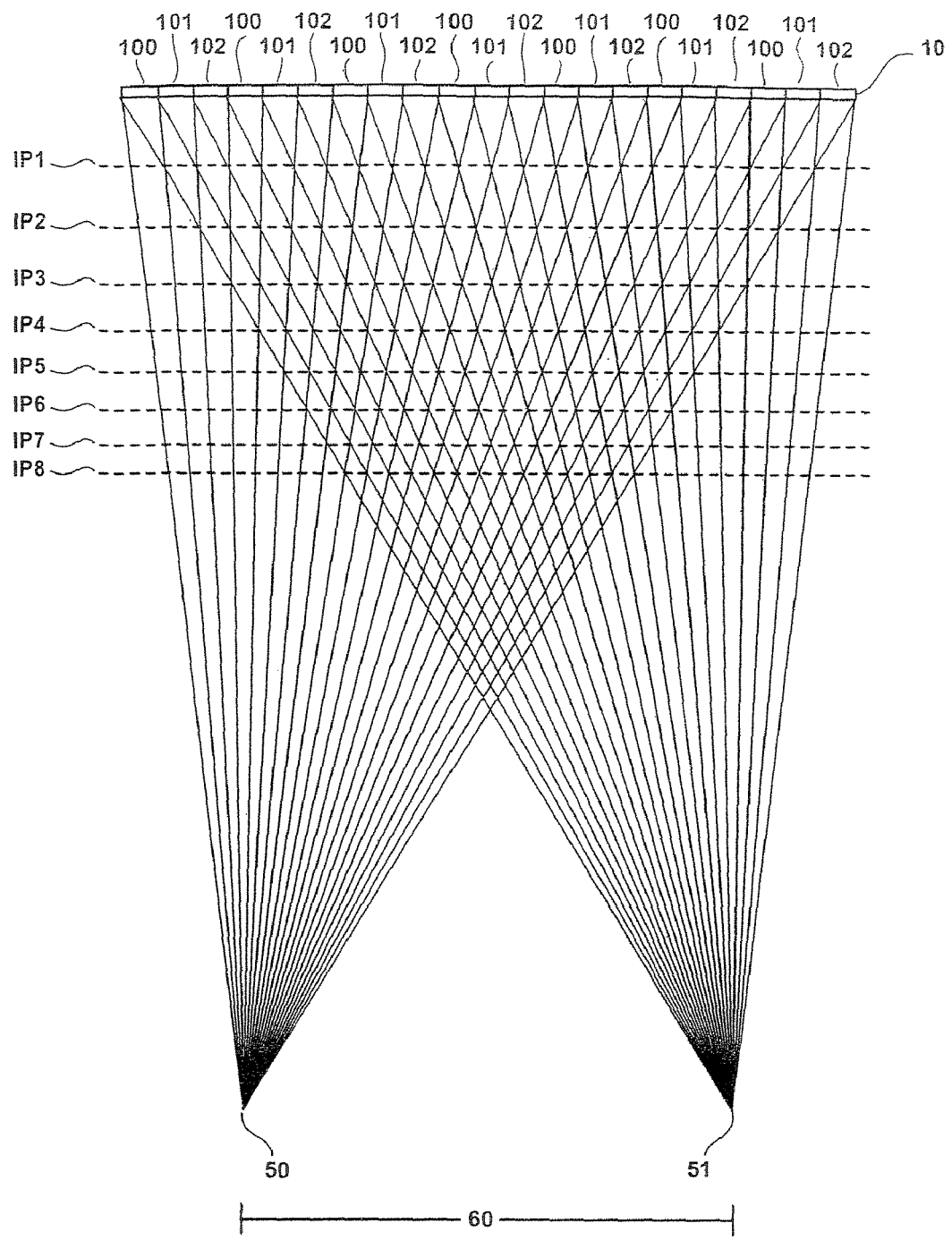
FIG. 5 is a schematic diagram depicting the left/right crossing points of the first eight intersection planes, or layers, of a stereoscopic viewing system incorporating a frontal parallax barrier in accordance with the invention.

As a solution to this problem, and with reference to FIG. 5, the concept of multiple intersection planes between the display pixels and the viewer is discussed. Given a particular distance between the viewer's eyes 50, 51 and a display 10, light originating from sub-pixels 100, sub-pixels 101, and sub-pixels 102 converge both at the viewer's left eye 50 and the viewer's right eye 51. The center-to-center separation 60 between the eyes 50, 51, is generally referred to as the interpupillary distance.

As should be apparent to those skilled in the art, intersection planes IP1 through IP8 mark only the first eight examples of a plurality of possible convergence planes between the display pixels and the viewer.

With reference again to FIG. 2, it will be assumed that the algebraic formula (5), above, provides that the first intersection plane, g, (depicted in FIG. 5 as LP1), situated at a 0.59 mm distance from the display 10, will allow an optimal viewing distance, z, of 375 mm. It also will be assumed that the combined thickness of the display's front surface substrate and any optional polarizer sheet is greater than 0.59 mm. With such assumptions, an anaglyphic parallax barrier enabling the desired optimal viewing distance, z, of 375 mm still can be achieved by situating the parallax barrier at the second intersection plane, IP2.

In order to accurately calculate the distance, g, between the display 10 and the second intersection plane (depicted in FIG. 5 as IP2), the equation (5) needs to be modified to properly account for the concept of multiple intersection planes.

$$k = i \cdot f \quad (6)$$

With reference to equation (6), we first multiply the sub-pixel pitch, i, by the positional factor of the layer, f, resulting in a pitch factor k. The positional factor, f, is equal to the sequence number of the intersection plane, with the intersection plane closest to the display counted as number 1. For example, given a sub-pixel pitch, i, of 0.1 mm, a positional factor, f, of 2, for the second intersection plane, the pitch factor, k, is calculated to be 0.2 mm. As another example, given a sub-pixel pitch, i, of 0.1 mm, a positional factor, f, of 4, for the fourth intersection plane, the pitch factor, k, is calculated to be 0.4 mm.

$$g = k \left( \frac{z-k}{e} \right) \quad (7)$$

The resulting pitch factor, k, of equation (6) now substitutes the sub-pixel pitch, i, in equation (5), to arrive at equation (7), which enables the distance between the display 10 and the second intersection plane IP2 to be calculated. Again, given the previous example of assuming a desired optimal viewing distance, z, of 375 nun, a sub-pixel pitch, i, of 0.1 mm, and an average eye separation, e, of 64 mm, it is calculated using equation (7) that the distance to the second intersection plane, g, (IP2 in FIG. 5), is 1.17 mm.

It should be noted that, in the context of the present invention and all of its embodiments, any intersection plane divisible by three cannot be used for placement of an anaglyphic parallax barrier. This includes the third intersection plane IP3, the sixth intersection plane IP6, the ninth intersection plane IP9, and so forth.

Figure 15:
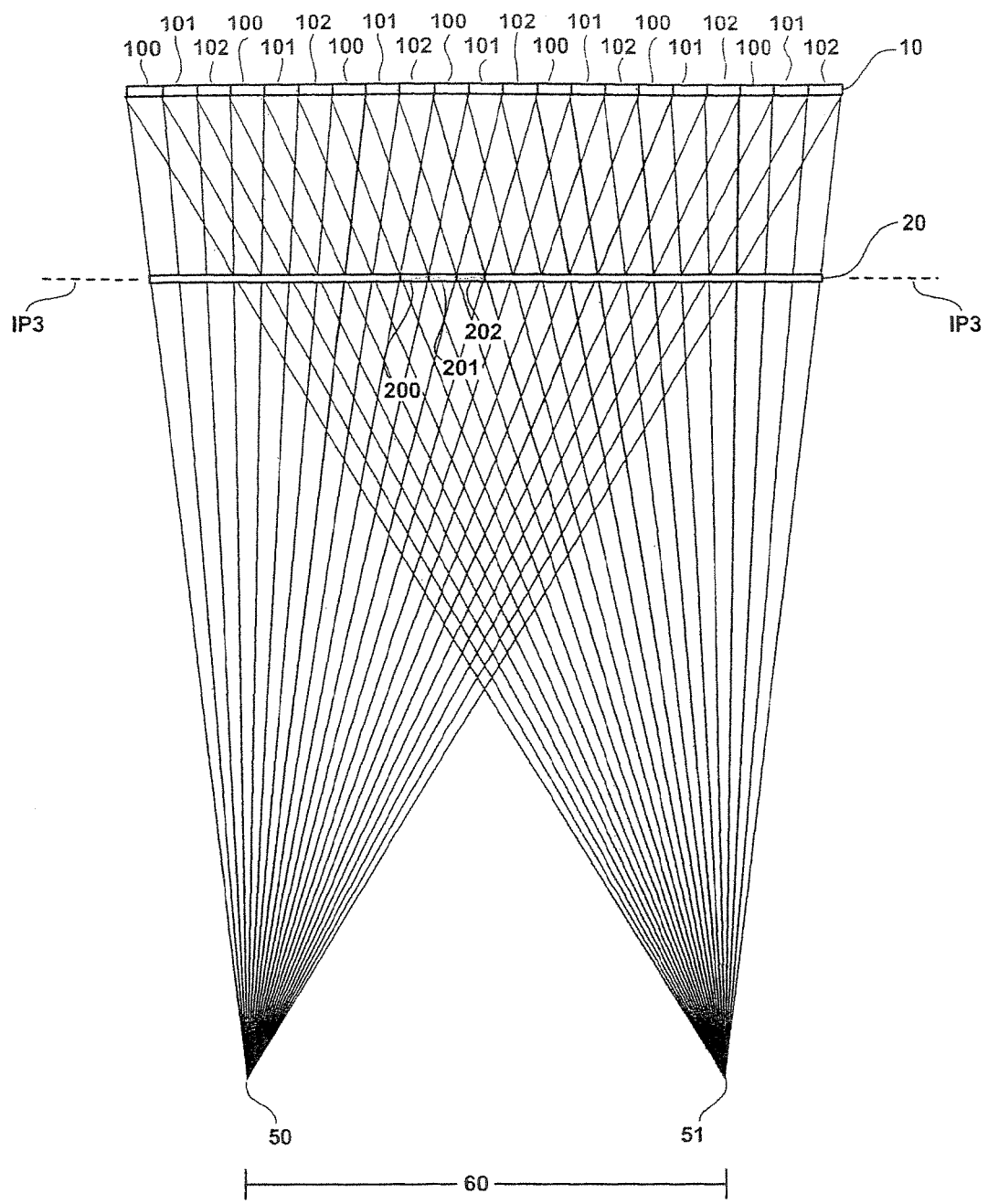
FIG. 15 is a schematic view of a non-stereoscopic viewing system, for illustration purposes only, the system incorporating a frontal parallax barrier at the third intersection plane.

FIG. 15 depicts an example of such a non-functional configuration at intersection plane IP3. It can be observed that the light-filtering region 200 intersects light traveling from a sub-pixel 100 to the viewer's right eye 51, and it also intersects light traveling from a different sub-pixel 100 to the viewer's left eye 50. Further, the light-filtering region 201 intersects light traveling from a sub-pixel 101 to the viewer's right eye 51, and it also intersects light traveling from a different sub-pixel 101 to the viewer's left eye 50. Further, the light-filtering region 202 intersects light traveling from a sub-pixel 102 to the viewer's right eye 51, and it also intersects light traveling from a different sub-pixel 102 to the viewer's left eye 50. Since all three light-filtering regions block two sub-pixels with identical spectral ranges concurrently, this particular configuration should avoided when designing anaglyphic parallax barrier in accordance with the invention.

Figure 21:
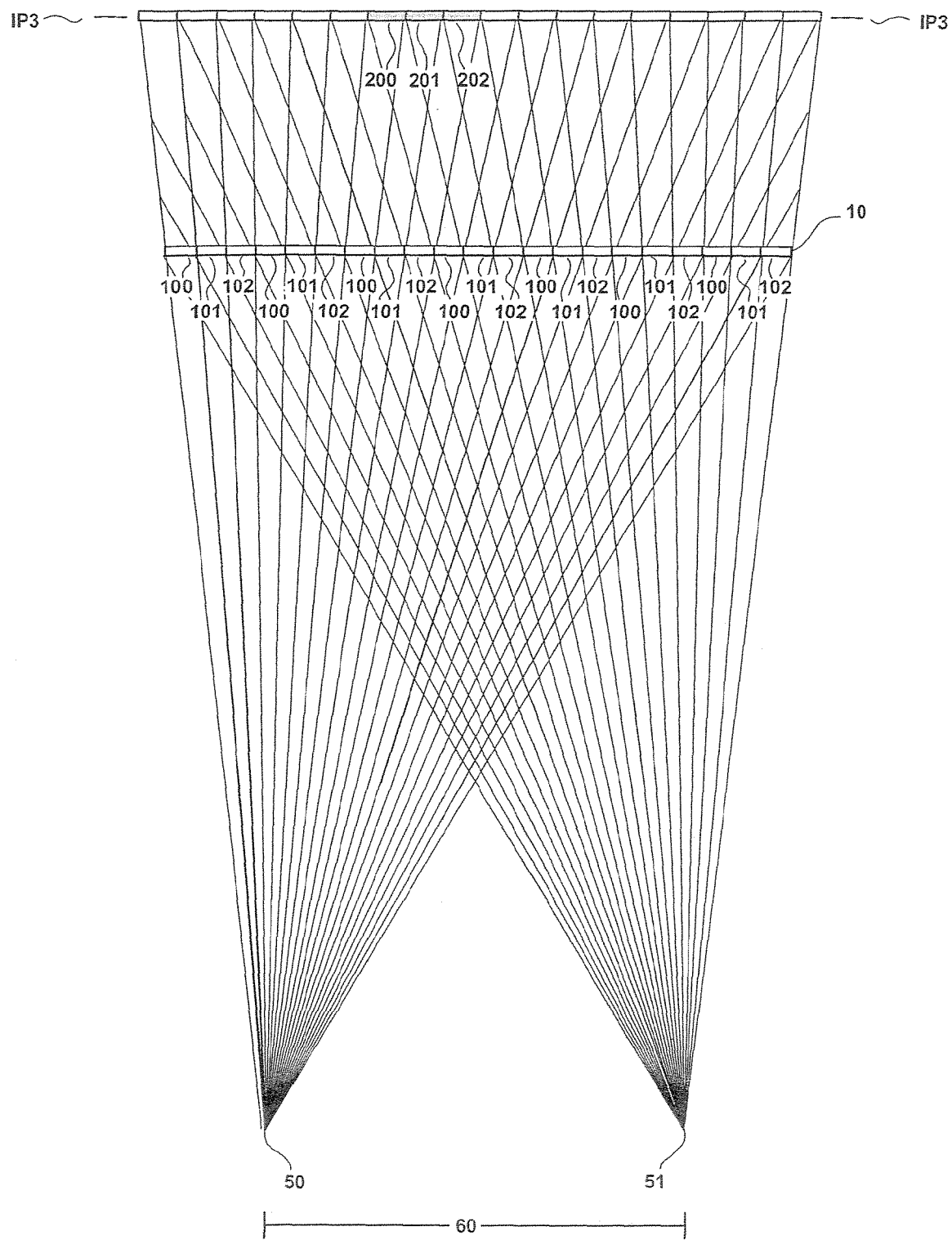
FIG. 21 is a schematic view of a non-stereoscopic viewing system, for illustration purposes only, the system incorporating a rear parallax barrier at the third intersection plane.

It should noted, however, that a configuration on the third intersection plane, or IP3 as depicted in FIG. 21, can be used as an additional light filter in conjunction with any of the disclosed frontal parallax barriers implementations. For example, such a light filter could be used to reduce the amount of stray light, prevent color leaking, and minimize light diffraction, which is the slight bending of light as it passes around the edge of an object. The amount of bending depends on the size of the wavelength of light relative to the size of the opening. Depending on the dimension and configuration of the light-filtering regions in the various implementations of the invention, light diffraction might increase the amount of cross-talk or ghosting (a colloquial term implying 'ghost imaging'), where one eye receives, in addition to its own image, a faint copy of the image intended for the other eye. In severe cases, ghosting can interfere with stereopsis to the point of complete obstruction, therefore preventing stereoscopic vision.

With continued reference to FIG. 15, a light-filtering region 200 that transmits only light having the same or similar spectral range as that of the sub-pixels 100, in the context of two sub-pixels 100, can substantially reduce the amount of cross-talk or ghosting caused by neighboring sub-pixels. Similarly, a light-filtering region 201 that transmits only light having the same or similar spectral range as that of sub-pixel 101, in the context of two sub-pixels 101, and a light-filtering region 202 that transmits only light having the same or a similar spectral range as that of sub-pixel 102, in the context of two sub-pixels 102, can substantially reduce the amount of cross-talk or ghosting caused by neighboring sub-pixels.

$$p = n - 1 \quad (8)$$

With reference now to equation (8), as well as to FIG. 1, the number of theoretical intersection planes between a display 10 and the viewer's left and right eyes 50, 51 can be determined by subtracting 1 from the number of the display's individual sub-pixels, n. With reference specifically to the simplified embodiment in FIG. 1, the total number, n, of sub-pixels 101, sub-pixels 102, and sub-pixels 103, is 21. Thus, the possible number of theoretical intersections planes, p, is 20. It should be noted, however, that in most configurations, only the first four intersection planes are used in implementing the invention. This assures the best possible performance of the light-filtering regions, and it provides the widest possible stereoscopic viewing window.

Geometry of the Rear Parallax Barrier

Figure 16:
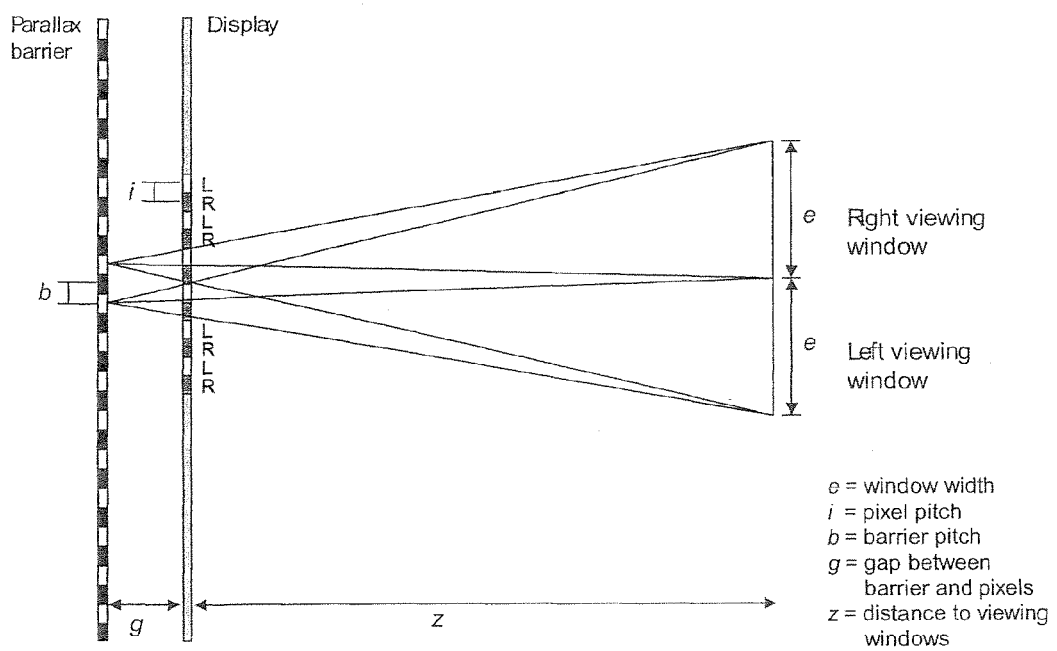
FIG. 16 is a schematic diagram depicting the basic geometry of a prior art stereoscopic viewing system incorporating a rear parallax barrier.

The principle of the two-view rear parallax barrier is illustrated in FIG. 16. The parallax barrier pitch, b, can be calculated using similar triangles as for the frontal parallax barrier described above:

$$\frac{b}{z+g} = \frac{i}{z} \quad (9)$$

The equation (9) can be rearranged to yield:

$$b = i \left( \frac{z+g}{z} \right) \quad (10)$$

In this case, the result (10) shows that the barrier pitch for achieving a viewpoint correction is slightly larger than the pixel pitch on the display. This small difference between the pixel and the barrier pitch accounts for the variation in viewing angle between the eyes and the pixels across the display and is often referred to as viewpoint correction.

Viewing distance, z, can again be determined by the gap, g, as described in (11), and it is likely to be constrained by substrate glass thickness when using an LCD or other type of flat panel display.

$$\frac{i}{g} = \frac{e}{z+g} \quad (11)$$

Again, equation (11) can be rearranged to yield the viewing distance, z:

$$z = g\left(\frac{e-i}{i}\right) \quad (12)$$

Although equations (9) through (12) assume a traditional, monochromatic, two-view, rear parallax barrier configuration, it is important to note that the basic geometry related to all rear parallax barrier embodiments of the present invention, and thus the algebraic equations to determine the barrier pitch of all rear parallax barrier embodiments, b as in (10), as well as the optimal viewing distance, z as in (12), are identical.

Description of Rear Intersection Planes

It should be noted that all known prior art stereoscopic imaging systems incorporating single-layer monochromatic rear parallax barriers make use of only the first intersection plane. Although several embodiments of the current invention use the first intersection plane, the invention is not limited to only that plane. To properly determine the location of the first intersection plane, it is necessary to evaluate the desired average distance between the display and the viewer. From the triangle depicted in FIG. 16, equation (12) can be rearranged to determine the spacing to the first rear intersection plane, g, based on (1) the distance, z, measured from the display's actual sub-pixel to the viewer, (2) the pixel pitch, i, and (3) the average eye separation, e.

$$g = i\left(\frac{z+i}{e}\right) \quad (13)$$

If, for instance, the desired viewing distance, z, is 375 mm, the pixel pitch, i, is 0.1 mm, the average eye separation, e, is 64 mm, then according to equation (13), the theoretical distance between a traditional parallax barrier and the pixels of the display, or in other words, the first intersection plane, g, would be a distance of 0.59 mm.

It will be appreciated by those of ordinarily skill in the art that traditional rear-parallax barriers used in conjunction with commonly known liquid crystal displays (LCDs) generally assume the substrate thickness plus the thickness of the polarizer sheet to be the first intersection plane. It should be noted that the present invention establishes the concept of a theoretical first rear intersection plane that then provides the basis of determining the locations of a plurality of additional rear intersection planes, at which several embodiments of the present invention are either solely or partially situated.

As discussed earlier, although recent glass substrates such as Corning's EAGLE 2000 are available to flat panel display manufacturers in thicknesses of 0.63 mm and 0.50 mm, a large number of flat panel displays currently available still feature glass substrates having thicknesses of 0.70 mm or more. In the context of a stereoscopic imaging system incorporating a rear parallax barrier in accordance with this invention, it should be noted that it is also necessary to consider the rear substrate and rear polarizer sheet, which in combination with the front substrate substantially increase the minimum distance from the sub-pixels 100, 101, and 102 of the display. Referring to FIG. 16 and assuming a desired optimal viewing distance, z=375 mm, a sub-pixel pitch, i=0.10 mm, and an average eye separation, e=64 mm, according to equation (13) above, the thickness of the front substrate 0.63 nun or 0.70 mm in thickness, plus a similar thickness for the rear substrate, plus the optional rear polarizer sheet would exceed, g, the necessary first intersection plane situated at a distance of 0.59 mm from the pixels of the display.

Figure 17:
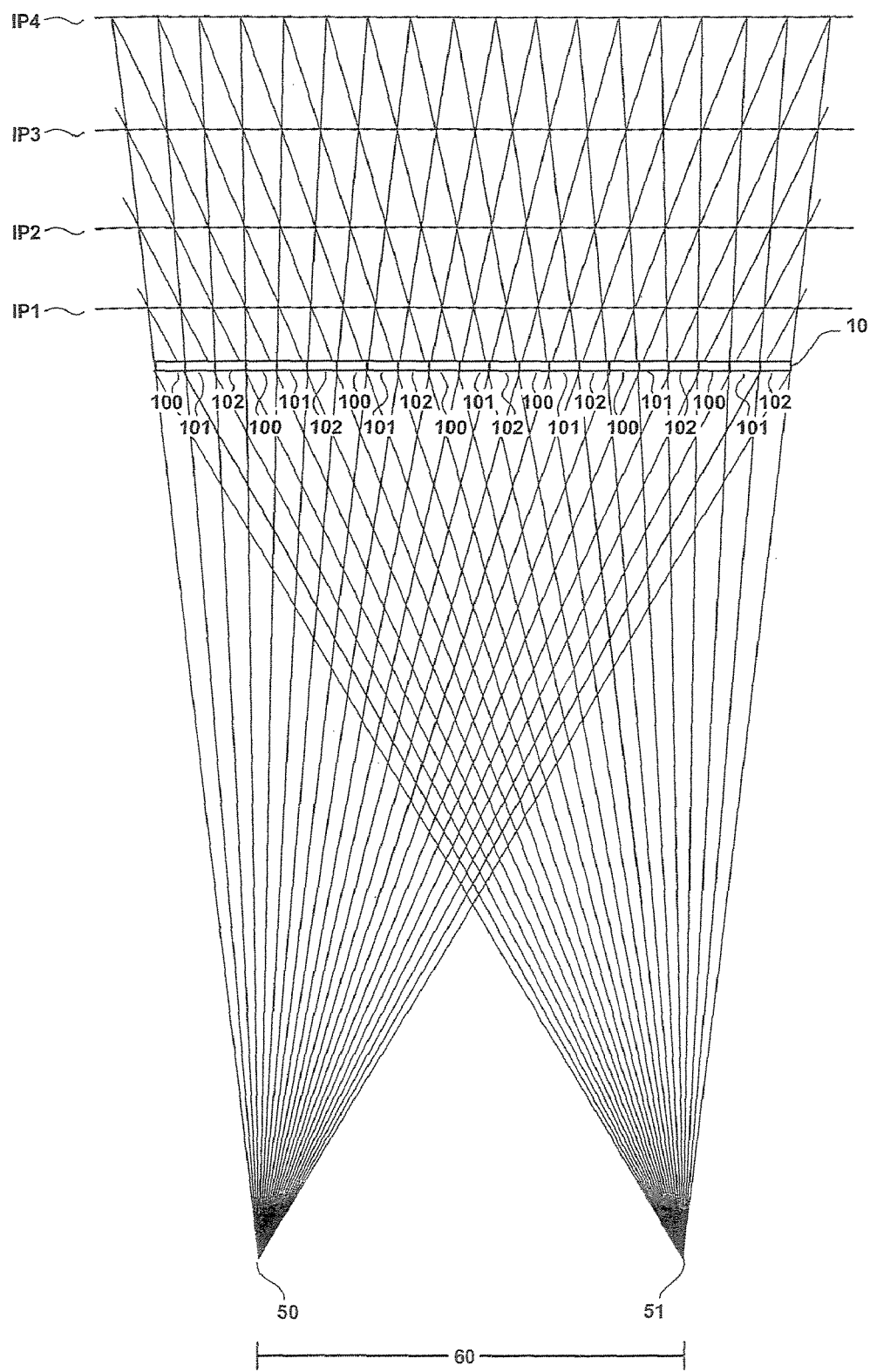
FIG. 17 is a schematic diagram depicting the left/right crossing points of the first four rear intersection planes, or layers, of a stereoscopic viewing system incorporating a rear parallax barrier in accordance with the invention.

As a solution to this problem and with reference to FIG. 17, the concept of multiple rear intersection planes behind the pixels of a display is discussed. For a particular distance between the eyes of a viewer 50, 51 and a display 10, light traveling through sub-pixels 100, sub-pixels 101, and sub-pixels 102 converge both at the viewer's left eye 50 and right eye 51. Both eyes 50, 51 are separated from each other, center-to-center, by a distance 60, generally known to those skilled in the art as the interpupillary distance.

As should be apparent to those of ordinary skill in the art, intersection planes IP1 through IP4 mark only the first four examples of a plurality of possible rear convergence planes behind the pixels of a display.

With reference again to FIG. 17 and assuming that according to the algebraic formula (13) above, the first intersection plane, g (depicted in FIG. 17 as IP1), situated at a distance of 0.59 mm from the display 10, will allow an optimal viewing distance, z=375 mm. It will also be assumed that the combined thickness of the display's front substrate, rear substrate, and rear polarizer sheet is greater than 0.59 mm. With such assumptions, an anaglyphic parallax barrier enabling the desired optimal viewing distance, z=375 mm, can still be achieved by situating the parallax barrier on the second intersection plane IP2, or if necessary on the fourth intersection plane IP4.

To accurately calculate the distance, g, between the display 10 and the second intersection plane, g (depicted in FIG. 17 as IP2), the equation (5) needs to be modified to properly account for the concept of multiple intersection planes.

$$k = i \cdot f \quad (14)$$

With reference to equation (14), the sub-pixel pitch, i, must first be multiplied by the positional factor of the layer, f, to yield a pitch factor, k. The positional factor, f, is equal to the sequence number of the intersection plane, with the intersection plane nearest to the display counted as number 1. For example, given a sub-pixel pitch, i=0.1 mm, and a positional factor, f=2 (for the second intersection plane), the pitch factor k=0.2 mm. As another example, given a sub-pixel pitch, i=0.1 mm, and a positional factor, f=4 (for the fourth intersection plane), the pitch factor k=0.4 mm.

$$g = k\left(\frac{z+k}{e}\right) \quad (15)$$

The resulting pitch factor k of equation (14) now substitutes the sub-pixel pitch, i, in equation (13), to arrive at equation (15), which calculates the distance between the display 10 and the second intersection plane IP2. Again, given the previous example of assuming a desired optimal viewing distance, z=375 mm, a sub-pixel pitch, i=0.1 mm, and an average eye separation, e=64 mm, according to equation (15), the second intersection plane (or IP2 in FIG. 17), g=1.17 mm.

As discussed above in the context of the frontal parallax barrier, it again should be noted that in the context of the present invention and all of its embodiments any rear intersection plane divisible by three cannot be used for placement of an anaglyphic rear parallax barrier. For example, this applies to the third intersection plane IP3, the sixth intersection plane IP6, the ninth intersection plane IP9, and so forth.

FIG. 21 depicts an example of such a non-functional configuration at intersection plane IP3. It can be observed that the light-filtering region 200 intersects light traveling through sub-pixel 100 to the viewer's right eye 51, and it also intersects light traveling through sub-pixel 100 to the viewer's left eye 50. Further, the light-filtering region 201 intersects light traveling through sub-pixel 101 to the viewer's right eye 51, and it also intersects light traveling through a different sub-pixel 101 to the viewer's left eye 50. Further, the light-filtering region 202 intersects light traveling through a different sub-pixel 102 to the viewer's right eye 51, and it also intersects light traveling through a different sub-pixel 102 to the viewer's left eye 50. Since all three light-filtering regions block two sub-pixels with identical spectral ranges concurrently, this particular configuration should be avoided when designing an anaglyphic parallax barrier as presented in the current invention.

It should noted, however, that a configuration on the third intersection plane, or IP3 as depicted in FIG. 21, can be used as an additional light filter in conjunction with any of the described rear parallax barriers implementations. For example, such a light filter could be used to reduce the amount of stray light, prevent color leaking, and minimize light diffraction, which is the slight bending of light as it passes around the edge of an object. The amount of bending depends on the relative size of the wavelength of light to the size of the opening. Depending on the dimension and configuration of the light-filtering regions in the various implementations of the invention, light diffraction might increase the amount of cross-talk or ghosting (a colloquial term implying 'ghost imaging'), where one eye receives, in addition to its own image, a faint copy of the image intended for the other eye. In severe cases, ghosting can interfere with stereopsis to the point of complete obstruction, therefore preventing stereoscopic vision.

With continued reference to FIG. 21, a light-filtering region 200 that transmits only light having the same or similar spectral range as that of sub-pixel 100, in the context of two sub-pixels 100, can substantially reduce the amount of cross-talk or ghosting caused by any neighboring sub-pixels. Similarly, a light-filtering region 201 that transmits only light having the same or similar spectral range as that of sub-pixel 101, in the context of two sub-pixels 101, and a light-filtering region 202 that transmits only light having the same or a similar spectral range as that of sub-pixel 102, in the context of two sub-pixels 102, can substantially reduce the amount of cross-talk or ghosting caused by any neighboring sub-pixels.

$$p = n - 1 \quad (16)$$

With reference now to equation (16) as well as FIG. 17, the theoretical number of rear intersection planes located behind the display 10 can be determined by subtracting 1 from the combined number of individual sub-pixels, n, that are part of the display. As shown in FIG. 17, the number of sub-pixels 101, sub-pixels 102, and sub-pixels 103 all combined add up to n=21. Thus, the possible number of theoretical intersections planes p=20. It should be noted, however, that in most configurations, only the first four intersection planes are preferable for implementation of any embodiment in accordance with the invention. This assures the best possible performance of the light-filtering regions, and it provides the widest possible stereoscopic viewing window.

Description of Reflective Rear Parallax Barriers

Traditional parallax barriers include an array of thin opaque vertical stripes placed on a transparent substrate, which are separated by transparent regions of a similar width. As discussed above, this configuration ensures that light reaching the viewer's left eye originates from a different set of pixels or sub-pixels of an RGB display from that reaching the viewer's right eye.

Sharp has now developed a switchable stereoscopic 2D/3D display incorporating a parallax barrier in the form of an LCD array, in which the opaque regions consist of liquid crystal molecules instead of printed pigments or dye molecules. This allows for the opaque regions of the liquid crystal-based parallax barrier to be switched on and off, thereby allowing light to be either blocked in 3D mode or to pass through in 2D mode.

It should be noted that known prior stereoscopic imaging systems incorporating either static or switchable rear parallax barriers are based on light-blocking regions that function on the basis of light absorbance. This is typically achieved using a very dark light-absorbing pigment or dye. The preferred color typically is a dense black, which offers a low reflection ratio and absorbs a majority of the impinging light.

The use of light-absorbing regions may be necessary in the context of front parallax barriers, because internal reflections should to be avoided to prevent any noticeable ghosting or cross-talk. However, it is an additional aspect of this invention to demonstrate that in the context of rear parallax barriers in combination with backlit type displays such as LCDs, it is preferable to use light-reflecting regions instead of light-absorbing regions. The advantage of a light-reflecting region is that impinging light can be reflected back to its emitting light source or light diffuser, as is commonly used in prior known LCD displays. This allows the reflected light to be routed back towards the front substrate of the display, thereby minimizing a substantial loss of light traditionally associated with the use of rear parallax barriers.

Static light-reflecting regions may be produced by using a metal coating such as the coatings commonly used in the production of mirrors, or a chrome coating used in modern reflectors or automotive parts. Metal inks or pigments may alternatively be used to produce static light-reflecting regions having a sufficient level of reflectivity.

Static light-reflecting regions also may be produced using retarder-based color polarizers. U.S. Pat. No. 5,751,384 discloses such a polarizer. Retarder stack technology utilizes polarization, rather than thin-film interference or absorption effects, and it produces a first color spectrum of an impinging light source along a first axis and a second color spectrum along a second axis. Light-reflecting regions in the context of the invention may be produced by stacking a retarder-based color polarizer on top of a reflective polarizer. One example of such a combination is a Vikuiti™ dual brightness enhanced film (DBEF), produced by 3M. Since the electric vector of one color spectrum traveling through the reflective polarizer is now perpendicular to the other, one is reflected while the other is transmitted.

Switchable light-reflecting regions also are possible through the use of electrochromic thin films, which have the ability to revert between a reflective state and a transparent state. Electrochromism is a term that refers to a reversible change of color exhibited by some materials when placed in an electric field. Some materials can exhibit a mirror-like state when no electric field is present, and change to a transparent state when an electric field is applied, and vice versa. By laminating thin films of electrochromic materials between electrodes, an electrochromic device is created, also termed a "switchable mirror" or "switching device." Researchers at the University of California, Berkeley recently created a thin film made from an alloy of magnesium and one or more transition metals. This film enables a glass substrate to which it is bonded to be reversibly switched between reflecting and transparent states, either by applying an electrical current or by exposing it to hydrogen gas.

Specific Embodiments of the Invention

Several embodiments of the invention now will be described with reference to specific drawings.

Basic First Layer Only, Three-Segment Configuration for Traditional Color Anaglyph [e.g., Red on Left/Cyan on Right]—(2B/1B/0B)

With reference now to FIG. 1 of the drawings, there is shown a first embodiment of the invention, including a display 10 that is divided into a first region 100 representing a first sub-pixel emitting light of a first spectral range (e.g., red), a second region 101 representing a second sub-pixel emitting light of a second spectral range (e.g., green), and a third region 102 representing a third sub-pixel emitting light of a third spectral range (e.g., blue). Typically, the common display colors of red, green, and blue are referred to as an RGB display.

Also shown in FIG. 1 is a frontal parallax barrier 20 that is divided into a first light-filtering region 2B, for blocking light emanating from both sub-pixel 100 and sub-pixel 101; a second light-filtering region 1B, for transmitting light emanating from sub-pixel 101 while blocking light emitted from sub-pixel 102; and a third light-filtering region 0B, for transmitting light emanating from both sub-pixel 102 and sub-pixel 100.

The proper placement of the frontal parallax barrier 20 and its light-filtering regions 2B, 1B, and 0B ensures that the viewer's left eye 50 can see only sub-pixel 100 and that the viewer's right eye 51 can see only sub-pixels 101 and 102. Assuming that the viewer is looking at an anaglyphic composite RGB image, as known by those skilled in the art, which displays the left view on sub-pixel 100 and the right view on sub-pixels 101 and 102, a vectoring of discrete image information to go to each eye and a perception of depth is attained.

It should be noted that this and many of the various embodiments of the invention assume the left image to be displayed on sub-pixel 100 and the right image to be displayed on sub-pixels 101 and 102. However, as explained below in the discussion of FIG. 14, it also is possible to reverse the placement of the left and right views, so that the right image is displayed on sub-pixel 100 and the left image is displayed on sub-pixels 101 and 102.

It also should be noted that other variations are possible, assuming an anaglyphic image configuration, in which any one of three sub-pixels displays one view of an anaglyphic composite RGB image and the remaining two sub-pixels display the second view of the image. Thus, it should be clear that the example provided in FIG. 1 is exemplary only, and that the scope of the present invention described herein is not limited to the specific details of such example.

A concrete example of such a traditional anaglyphic image configuration is the previously described red/cyan composite RGB image, in which the left view has been encoded in the red channel and the right view has been encoded in the green and blue (i.e., cyan) channel. As is well known to those skilled in the art, the described red/cyan anaglyphic configuration has evolved into the most popular and preferred anaglyphic encoding method. However, other configurations are possible and have been tried in the past, particularly in the context of viewing anaglyphic composite RGB images through spectacles equipped with color gels.

For most display purposes, color mixing is additive, and the color primaries accordingly are red, green, and blue. Addition of equal amounts of the two collateral color primaries produces the complementary subtractive color primary. A simple notation for the basic colors of a 1-2 anaglyphic partitioning therefore is red-cyan, green-magenta, and blue-yellow, with the numeral 1 signifying one left color primary seen by the left eye and the numeral 2 signifying two night color primaries seen by the right eye. By reversing each 1-2 configuration, three 2-1 anaglyphic configurations are provided: cyan-red, magenta-green, and yellow-blue, with the numeral 2 signifying two left color primaries seen by the left eye and the numeral 1 signifying one right color primary seen by the right eye. The primary goal of modern anaglyphic art is to represent full-color anaglyphic composite RGB images, so it is not necessary to refer to the six possible configurations of 1-1 anaglyphic partitioning (red-green, green-red, green-blue, blue-green, red-blue, blue-red). Each of these configurations can be represented either by one related 1-2 configurations or by one related 2-1 anaglyphic configuration. For example, a red-green anaglyphic composite image can be represented with either the magenta-green 2-1 or red-cyan 1-2 anaglyphic composite RGB image, with the blue channel in either configuration effectively being empty.

It should be noted that, in the context of all of the embodiments of the invention, the light-filtering regions in the parallax barriers 20 and/or 30 can be rearranged to function in conjunction with any of the three described 1-2 anaglyphic configurations or with any of the three described 2-1 anaglyphic configurations. It, therefore, should be clear that the embodiments depicted in the figures are exemplary only and that the scope of the present invention described herein is not limited to the specific details of such examples.

For example, to produce a parallax barrier for a particular 1-2 anaglyphic RGB configuration described above, it is necessary that the viewer's left eye 50 be able to see only light emanating from the single left primary sub-pixel of the 1-2 anaglyphic RGB configuration, e.g., the blue sub-pixel in the case of a blue/yellow anaglyphic configuration, while being unable to see light emanating from the two right primary sub-pixels of the 1-2 anaglyphic RGB image, e.g., the green and red sub-pixels in the case of a blue/yellow anaglyphic configuration. Similarly, it is necessary that the viewer's right eye 51 be able see only light emanating from the two right primary sub-pixels of the 1-2 anaglyphic RGB image, e.g., the green and red sub-pixels in the case of a blue/yellow anaglyphic configuration, while being unable to see light emanating from the single left primary sub-pixel of the 1-2 anaglyphic RGB image, e.g., the blue sub-pixel in the case of a blue/yellow anaglyphic configuration.

Similarly, to produce a parallax barrier for a particular 2-1 anaglyphic configuration, it is necessary that the viewer's left eye 50 be able to see only light emanating from the two left primary sub-pixels of the 2-1 anaglyphic RGB image, e.g., the red and blue sub-pixels in the case of a magenta/green anaglyphic configuration, while being unable to see light emanating from the single right primary sub-pixel of the 2-1 anaglyphic RGB image, e.g., the green sub-pixel in the case of a magenta/green anaglyphic configuration. Similarly, it is necessary that the viewer's right eye 51 to be able to see only light emanating from the single right primary sub-pixel of the 2-1 anaglyphic RGB image, e.g., the green sub-pixel in the case of a magenta/green anaglyphic configuration, while being unable to see light emanating from the two left primary sub-pixels of the 2-1 anaglyphic RGB image, e.g., the red and blue sub-pixels in the case of a magenta/green anaglyphic configuration.

The basic parallax barrier geometries depicted in FIG. 2 are valid for all embodiments of the invention in which the parallax barrier is located between the display 10 and the viewer. With reference again to FIG. 1, equation (7) can be used to calculate the distance between the display 10 and the parallax barrier 20 at the intersection plane IP1. Further, equation (2) can be used to calculate the barrier pitch, which corresponds to the widths of the light-filtering regions 2B, 1B, and 0B. It should be pointed out that the widths of the three light-filtering regions are identical for this first embodiment of the invention. Again, as can be seen from FIG. 1, and as reflected in equation (2), the geometry of the parallax barrier 20 is dependent on the distance of the viewer from the display and on the distance between the viewer's eyes 50, 51.

For a concrete example of this particular embodiment of the invention, and with continued reference to FIG. 1, it is assumed that sub-pixel 100 is emanating in the red spectrum range, sub-pixel 101 is emanating in the green spectrum range, and sub-pixel 102 is emanating in the blue spectrum range. It should be clear to those skilled in the art that this represents the standard pixel configuration of a common RGB display.

It also is assumed that the viewer is observing an anaglyphic composite RGB image, in which the left view has been encoded in the red channel and the right view has been encoded in the green and blue (i.e., cyan) channel. As is well known to those skilled in the art, the described red/cyan anaglyph configuration has evolved into the most popular anaglyph encoding method, and it represents a large majority of anaglyphic imagery published to date. Thus, it is deemed a real-world example of anaglyphic imagery to be used in the context of the present invention.

Further, and again only for this particular embodiment of the invention (FIG. 1), it is assumed that the light-filtering region 2B is black, the light-filtering region 1B is green, and the light-filtering region 0B is magenta. According to commonly accepted theories of additive color synthesis, a green-colored gel will transmit only green light and substantially block red and blue light, and a magenta-colored gel will transmit only blue and red light and substantially block green light. Of course, black will substantially block all three primary colors (i.e., red, blue, and green).

As discussed above, a proper placement of the parallax barrier 20 and its light-filtering regions 2B, 1B, and 0B, as depicted in FIG. 1, ensures that the viewer's left eye 50 is able to see only light emanating from the red sub-pixel 100 through the magenta light-filtering region 0B, while the black light-filtering region 2B substantially blocks light emanating from the green sub-pixel 101 and the green light-filtering region 1B substantially blocks light emanating from the blue sub-pixel 102. Similarly, the viewer's right eye 51 is able to see only light emanating from the green sub-pixel 101 through the green light-filtering region 1B, as well as light emanating from the blue sub-pixel 102 through the magenta light-filtering region 0B, while the black light-filtering region 2B substantially blocks light emanating from the red sub-pixel 100.

It should be noted that the choice of black for the light-filtering region 2B satisfies the definition of 2B, as blocking the view from the left eye to the underlying right sub-pixel while concurrently blocking the view from the right eye to the underlying left sub-pixel. Further, the choice of green for light-filtering region 1B satisfies the definition of 1B, as blocking the view from the left eye to the underlying right sub-pixel while concurrently permitting the view from the right eye to the underlying left sub-pixel. Finally, the choice of magenta for the light-filtering region 0B satisfies the definition of 0B, as permitting the view from the left eye to the underlying right sub-pixel while concurrently permitting the view from the right eye to the underlying left sub-pixel.

Since the viewer's left eye 50 sees only the left view encoded in the red channel and the viewer's right eye 51 sees only the right view encoded in the red and blue channel, vectoring of discrete image information to each eye, and a perception of depth, is attained.

Second Layer Only, Three-Segment Configuration-(2B/0B/1B)

Figure 6:
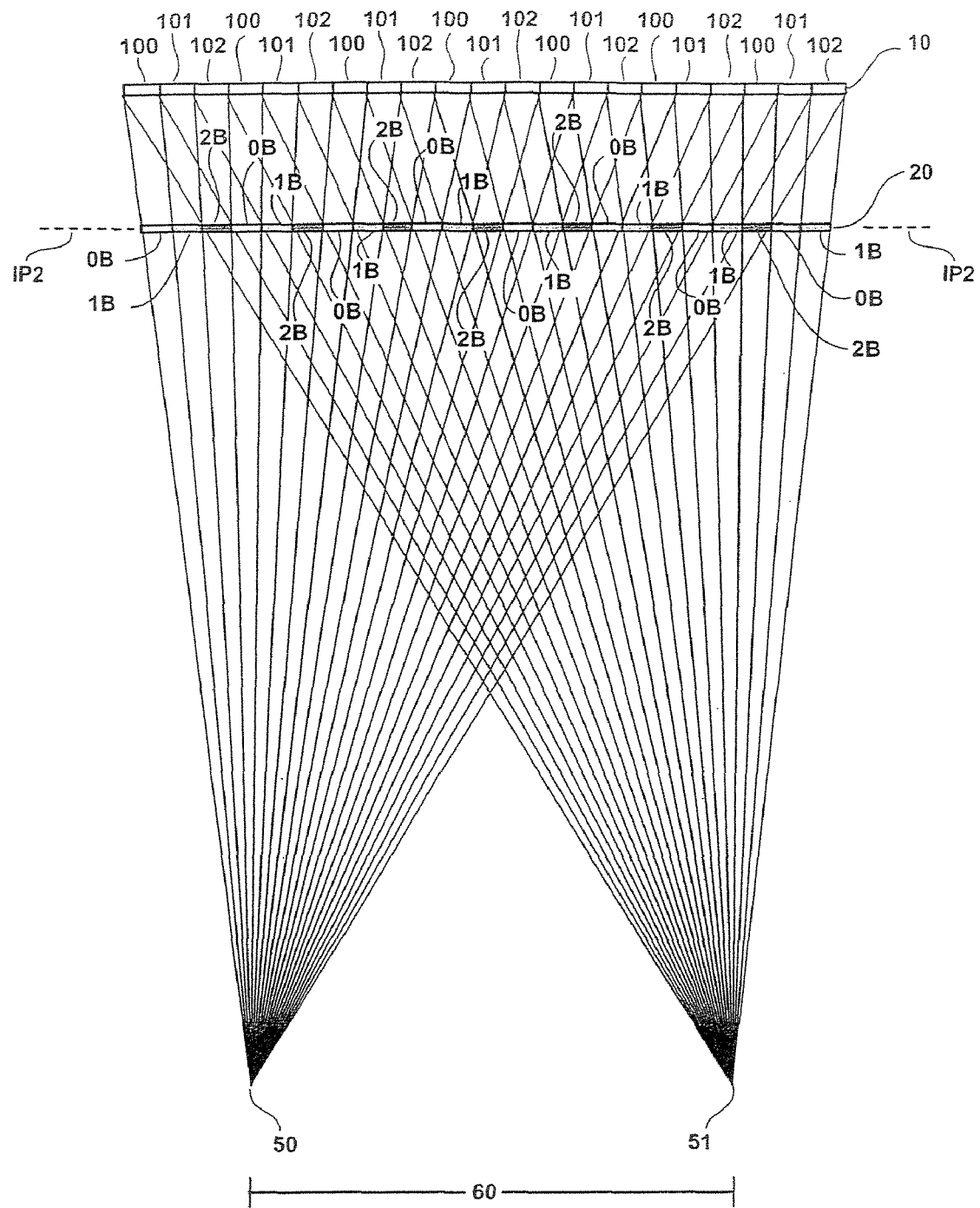
FIG. 6 is a schematic diagram depicting a stereoscopic viewing system in accordance with a first embodiment of the invention, incorporating a three-segment, frontal parallax barrier (2B/0B/1B) at the second intersection plane.

With reference now to FIG. 6, there is shown a second embodiment of the invention, in which a parallax barrier is placed not at the first intersection plane, but rather at an alternative intersection plane, while still operating at the same viewing distance between the display 10 and the viewer's eyes 50, 51. For instance, as described earlier, the transparent substrate (not shown in FIG. 6) overlaying the pixels of the display 10 can sometimes be thicker than the distance between the pixels and the first intersection plane IP1. Rather than attempt to embed a parallax barrier within the substrate, the embodiment of FIG. 6 instead places the parallax barrier 20 at the second intersection plane IP2. This placement requires a different configuration for the light-filtering regions 2B, 1B, and 0B, as compared to their configuration in the first intersection plane IP1.

As shown in FIG. 6, the parallax barrier 20 is divided into first light-filtering regions 2B, for blocking light emanating from both the sub-pixels 100 and the sub-pixels 102; second light-filtering regions 0B, for transmitting light emanating from both the sub-pixels 101 and the sub-pixels 100; and third light-filtering regions 1B, for transmitting light emanating from the sub-pixel 102 while blocking light emitted from the sub-pixels 101. The proper placement of parallax barrier 20 and its light-filtering regions 2B, 0B, and 1B ensures that the viewer's left eye 50 is able to see only sub-pixel 100 and that the viewer's right eye 51 is able to see only sub-pixels 101 and 102.

Equation (7) can be used to calculate the distance between display 10 and the parallax barrier 20, at intersection plane IP2, as described above with respect to the embodiment of FIG. 1. Similarly, equation (2) can be used to calculate the barrier pitch, which corresponds to the widths of the light-filtering regions 2B, 1B, and 0B. It should be pointed out that the widths of the three light-filtering regions are identical for this second embodiment of the invention. Again, as can be seen from FIG. 1, and as reflected in equation (2), the geometry of the parallax barrier 20 is dependent on the distance of the viewer from the display and on the distance between the viewer's eyes 50, 51.

For a concrete example of this particular embodiment of the invention, and with reference again to FIG. 6, we assume the same sub-pixel configuration for display 10 as described above for the first embodiment of the invention (FIG. 1). We also assume that the viewer is observing an anaglyphic composite RGB image, as described above for such first embodiment. Further, and again only for this particular embodiment of the invention, we assume that the light-filtering region 2B is black, the light-filtering region 1B is blue, and the light-filtering region 0B is yellow. Further, according to commonly accepted theories of additive color synthesis, a blue-colored gel will transmit only blue light and substantially block red and green light, and a yellow-colored gel will transmit only red and green light and substantially block blue light. Of course, black will substantially block all three primary colors, i.e., red, blue, and green.

A proper placement of the parallax barrier 20 and its light-filtering regions 2B, 0B, and 1B, as depicted in FIG. 6, ensures that the viewer's left eye 50 can see only light emanating from the red sub-pixel 100 through the yellow light-filtering region 0B, while the black light-filtering region 2B substantially blocks light emanating from the blue sub-pixel 102 and the blue light-filtering region 1B substantially blocks light emanating from the green sub-pixel 101. Similarly, the viewer's right eye 51 can see only light emanating from the green sub-pixel 101 through the yellow light-filtering region 0B, as well as light emanating from the blue sub-pixel 102 through the blue light-filtering region 1B, while the black light-filtering region 2B substantially blocks light emanating from the red sub-pixel 100.

It should be noted that the choice of black for the light-filtering region 2B satisfies the definition of 2B, as blocking the view from the left eye to the underlying right sub-pixel, while concurrently blocking the view from the right eye to the underlying left sub-pixel. Further, the choice of blue for light-filtering region 1B satisfies the definition of 1B, as blocking the view from the left eye to the underlying right sub-pixel while concurrently permitting the view from the right eye to the underlying left sub-pixel. Finally, the choice of yellow for light-filtering region 0B satisfies the definition of 0B, permitting the view from the left eye to the underlying right sub-pixel while concurrently permitting the view from the right eye to the underlying left sub-pixel.

Since the viewer's left eye 50 sees only the left view encoded in the red channel and the viewer's right eye 51 sees only the right view encoded in the green and blue channels, vectoring of discrete image information to each eye, and a perception of depth, is attained.

Basic Two-Layer, One-Segment Configuration on First and Second Layers—(2Bo1B+2Bo1B)

Figure 11:
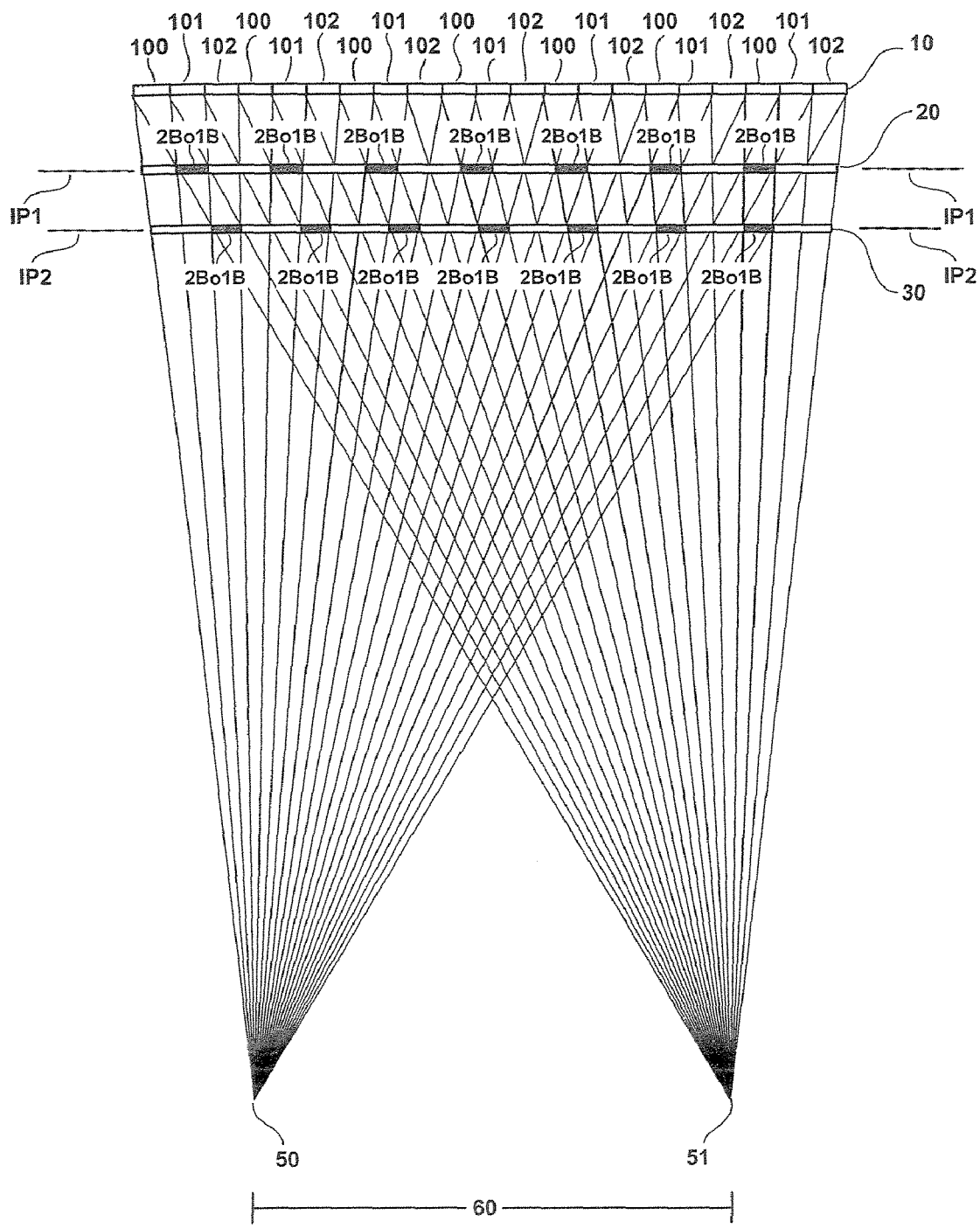
FIG. 11 is a schematic diagram depicting a stereoscopic viewing system incorporating two one-segment, frontal parallax barriers, located at the first and second intersection planes (2Bo1B+2Bo1B).

With reference now to FIG. 11, there is shown a third embodiment of the invention, in which two separate frontal parallax barriers 20 and 30 are included, for providing anaglyphic auto-stereoscopic viewing. More particularly, the parallax barrier 20 includes light-filtering regions 2Bo1B, for blocking light emanating from the sub-pixels 101 and optionally blocking light emanating from the sub-pixels 100, and the second parallax barrier 30 likewise includes light-filtering regions 2Bo1B, for blocking light emanating from sub-pixels 102 and, optionally, for blocking light emanating from the sub-pixels 100. It should be noted that the two frontal parallax barriers each can be located on its own substrate or, alternatively, can be located on the front and back sides of a single substrate.

The proper placement of the parallax barrier 20 and its light-filtering regions 2Bo1B ensures that the viewer's left eye 50 cannot see the sub-pixels 101 and that the viewer's right eye 51 cannot see the sub-pixels 100. Similarly, the proper placement of parallax barrier 30 and its light-filtering region 2Bo1B ensures that the viewer's left eye 50 cannot see the sub-pixels 102 and, optionally, that the viewer's right eye 51 cannot see the sub-pixels 100. Assuming that the viewer is viewing a standard anaglyphic composite RGB image, which displays the left view on the sub-pixels 100 and the right view on the sub-pixels 101 and 102, a vectoring of discrete image information to go to each eye, and a perception of depth, is attained.

It further will be appreciated by those skilled in the art that, similar to the first embodiment, many more variations for composing anaglyphic imagery are possible, as long as any one of three sub-pixels displays one view and the remaining two sub-pixels display the other view of an anaglyphic composite RGB image. Thus, it should be clear that the example provided in FIG. 11 is exemplary, only, and that the scope of the invention described herein is not limited to the specific details provided by this example.

Equation (7) can be used to calculate the distance between the display 10 and the parallax barrier 20, at intersection plane IP1, as well as the distance between display and the parallax barrier 30, at intersection plane IP2, as described above. Further, equation (2) can be used to calculate the barrier pitch of parallax barrier 20, which corresponds to the widths of its light-filtering regions 2Bo1B. Similarly, equation (2) can be used to calculate the barrier pitch of parallax barrier 30, which corresponds to the widths of its light-filtering regions 2Bo1B. It should be pointed out that the widths of the three light-filtering regions in the parallax barrier 20 are identical, and that the widths of the three light-filtering regions in the parallax barrier 30 likewise are identical. Again, as shown in FIG. 11, and as reflected in equation (2), the geometries of both the parallax barrier 20 and the parallax barrier 30 are dependent on the distance of the viewer from the display and on the distance between the viewer's eyes 50, 51.

For a concrete example of this embodiment of the invention, and with reference again to FIG. 11, it is assumed that the display 10 has the same sub-pixel configuration as described above for the first embodiment of this invention (FIG. 1). It also is assumed that viewer is observing an anaglyphic composite RGB image, as described above. Further, and again only for the embodiment of FIG. 11, it is assumed that light-filtering regions 2Bo1B of the parallax barriers 20 and 30 are black.

The proper placement of parallax barriers 20 and 30, and their light-filtering regions 2Bo1B ensures that the viewer's left eye 50 can see only light emanating from the red sub-pixels 100, through the gaps between the black light-filtering regions of two parallax barriers. Concurrently, the black light-filtering regions 2Bo1B on the parallax barrier 20 substantially block light emanating from the green sub-pixels 101, and the black light-filtering regions 2Bo1B on the parallax barrier 30 substantially block light emanating from the blue sub-pixels 102. Similarly, the viewer's right eye 51 can see only light emanating from the green sub-pixels 101 as well as light emanating from the blue sub-pixels 102 through the wider gaps between the black light-filtering regions 2Bo1B on the parallax barrier 20 and the wider gaps between the black light-filtering regions 2Bo1B on the parallax barrier 30, while the black light-filtering region 2Bo1B on the parallax barrier 20, and the black light-filtering 2Bo1B on the parallax barrier 30, substantially block light emanating from the red sub-pixels 100.

It should be noted that the choice of black for light-filtering regions 2Bo1B satisfies the definition of 2Bo1B, as blocking the view from the left eye to the underlying right sub-pixel while concurrently blocking the view from the right eye to the underlying left sub-pixel. It again should be noted, for further clarification, that 2Bo1B signifies that a 1B light-filtering region would suffice for the current embodiment as described in FIG. 11 and that a 2B light-filtering region optionally can be chosen.

It should again be noted, for further clarification, that 2Bo1B signifies that a 1B light-filtering region can be used in combination with a 2B light-filtering region on different parallax barriers, underlying the same sub-pixel as shown in FIG. 11. Alternatively, both 2Bo1B light-filtering regions could take the form of 2B regions. 1B light-filtering regions could not be used for both parallax barriers, for filtering the same overlying sub-pixel 101. For instance, the use of a magenta 1B light-filtering-region on the parallax barrier 20 and a yellow 1B light-filtering region on the parallax barrier 30 would allow red light to be transmitted through both regions and reach the viewer's right eye 51. For this reason, at least one of the two light-filtering regions overlying the sub-pixels 101 needs to be a 2B light-filtering region, so that the viewer's right eye 51 cannot see the sub-pixels 101.

Since the viewer's left eye 50 sees only the left view encoded in the red channel and the viewer's right eye 51 sees only the right view encoded in the green and blue channel, vectoring of discrete image information to each eye, and a perception of depth, is attained.

First Layer Only, Three-Segment Configuration for Reversed Anaglyph [Cyan on Left/Red on Right—(2B/1B/0B)

Figure 14:
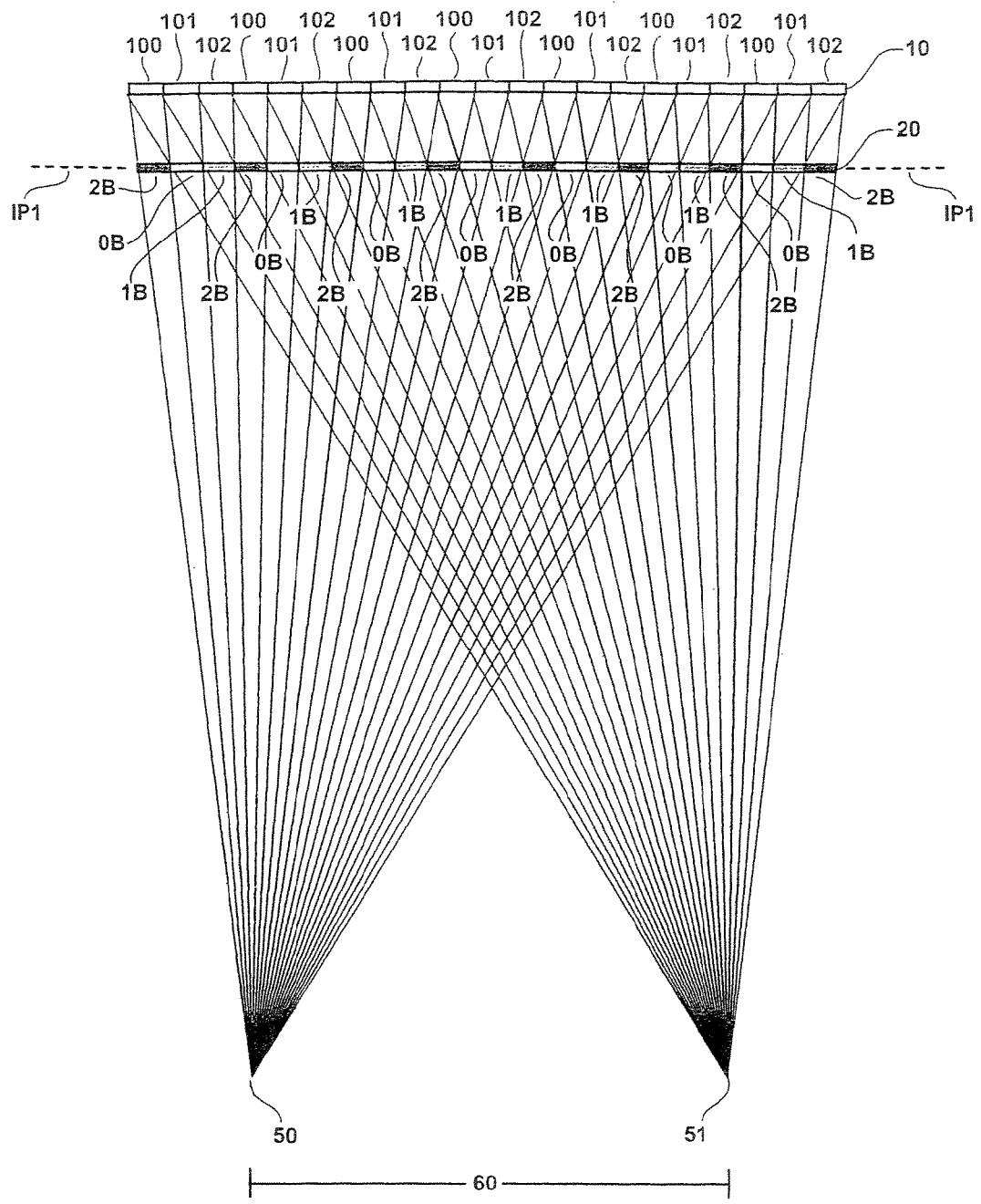
FIG. 14 is a schematic diagram depicting a stereoscopic viewing system incorporating a three-segment, frontal parallax barrier at the first intersection plane, which is similar to the system of FIG. 1, but which reverses the images such that a red image is transmitted to the right eye and a cyan image is transmitted to the left eye (2B/1B/0B).

With reference now to FIG. 14, there is shown a fourth embodiment of the invention, which is similar to the first embodiment, but differs in that the right image is shown on the sub-pixels 100 and the left image is shown on the sub-pixels 101 and 102. This is the inverse of the first three embodiments of this invention, discussed above, in which the left image is displayed on the sub-pixels 100 and the right image is displayed on the sub-pixels 101 and 102. This implementation of the first three embodiments is conventional and known to those skilled in the art; however, that implementation is exemplary, only, and the scope of the present invention described herein is not limited to anaglyphic RGB imagery created in this manner. Thus, it is possible to reverse the placement of the left and right images, as is achieved by the embodiment depicted in FIG. 14.

As shown in FIG. 14, a parallax barrier 20 includes first light-filtering regions 2B, for blocking light emanating from both the sub-pixels 102 and the sub-pixels 100; second light-filtering regions 0B, for transmitting light emanating from both the sub-pixels 102 and the sub-pixels 101; and third light-filtering regions 1B, for transmitting light emanating from the sub-pixels 102 while blocking light emanating from the sub-pixels 101.

The proper placement of parallax barrier 20 and its light-filtering regions 2B, 0B, and 1B ensures that the viewer's left eye 50 can see only the sub-pixels 101 and 102, and that the viewer's right eye 51 can see only the sub-pixels 100. Consequently, if the viewer looks at an anaglyphic composite RGB image that displays the left image on the sub-pixels 101 and 102 and the right image on the sub-pixels 100, a vectoring of discrete image information transmitted to each eye, and a perception of depth, is attained.

Equation (7) can be used to calculate the distance between display 10 and the parallax barrier 20, at intersection plane IP1, as described above with respect to the embodiment of FIG. 1. Similarly, equation (2) can be used to calculate the barrier pitch, which corresponds to the widths of the light-filtering regions 2B, 1B, and 0B. It should be pointed out that the widths of the three light-filtering regions are identical for this fourth embodiment of the invention. Again, as can be seen from FIG. 14, and as reflected in equation (2), the geometry of the parallax barrier 20 is dependent on the distance of the viewer from the display and on the distance between the viewer's eyes 50, 51.

For a concrete example of this particular embodiment of the invention, and with reference again to FIG. 14, it is assumed the same sub-pixel configuration for the display 10 as described above for the first embodiment of the invention (FIG. 1). It also is assumed that the viewer is observing an inverse anaglyphic composite RGB image, in which the right image has been encoded in the red channel and the left image has been encoded in the green and blue (i.e., cyan) channel. As well known to those skilled in the art, a cyan/red anaglyph configuration, although not as popular as the previously described red/cyan configuration, is a common anaglyph encoding method used in the production of anaglyphic imagery. Thus, it is deemed a real world example of anaglyphic imagery to be used in the context of the present invention.

Further, and again only for this particular embodiment of the invention depicted in FIG. 14, it is assumed that the light-filtering region 2B is black, the light-filtering region 0B is yellow, and the light-filtering region 1B is blue. According to commonly accepted theories of additive color synthesis, a blue-colored gel will transmit only blue light and substantially block red and green light; a yellow-colored gel will transmit red and green light and substantially block blue light; and, of course, black will substantially block all three primary colors (i.e., red, blue, and green).

A proper placement of parallax barrier 20 and its light-filtering regions 2B, 0B, and 1B, as depicted in FIG. 14, ensures that the viewer's left eye 50 can see only light emanating from the green sub-pixels 101 through the yellow light-filtering region 0B as well as light emanating from the blue sub-pixels 102 through the blue light-filtering region 1B, while the black light-filtering region 2B substantially blocks light emanating from the red sub-pixels 100. Similarly, the viewer's right eye 51 can see only light emanating from the red sub-pixels 100 through the yellow light-filtering region 0B, while the blue light-filtering region 1B substantially blocks light emanating from the green sub-pixels 101 and the black light-filtering region 2B substantially blocks light emanating from the blue sub-pixels 102.

It should be noted that the choice of black for the light-filtering region 2B satisfies the definition of 2B, as blocking the view from the left eye to the underlying right sub-pixels while concurrently blocking the view from the right eye to the underlying left sub-pixel. Further, the choice of blue for light-filtering region 1B satisfies the definition of 1B, as blocking the view from the right eye to the underlying right sub-pixel while concurrently permitting the view from the left eye to the underlying left sub-pixel. Finally, the choice of yellow for light-filtering region 0B satisfies the definition of 0B, as permitting the view from the left eye to the underlying right sub-pixel while concurrently permitting the view from the right eye to the underlying left sub-pixel.

Since the viewer's left eye 50 sees only the left view encoded in the green and blue channel, and the viewer's right eye 51 sees only the right view encoded in the red channel, vectoring of discrete image information to each eye, and a perception of depth, is attained.

Other Embodiments of the Invention

Figure 7:
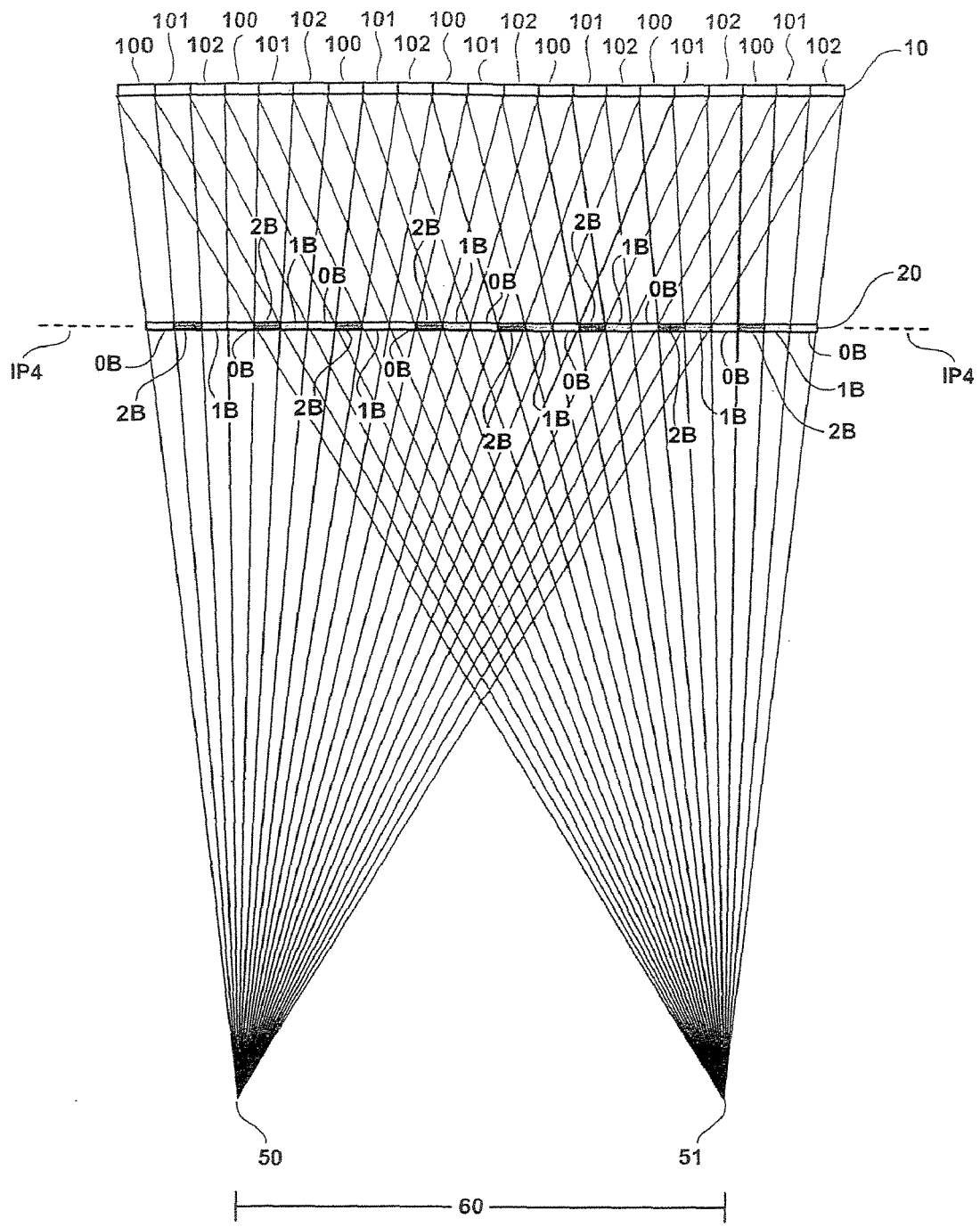
FIG. 7 is a schematic diagram depicting a stereoscopic viewing system in accordance with another embodiment of the invention, incorporating a three-segment, frontal parallax barrier (2B/1B/0B) at the fourth intersection plane.

FIG. 7 depicts another embodiment of the invention, this embodiment incorporating a three-segment parallax barrier (2B/1B/0B). The parallax barrier is identical in function to the one described in connection with FIG. 1, except that it is located not at the first intersection plane IP1, but rather at the fourth intersection plane IP4.

Figure 8:
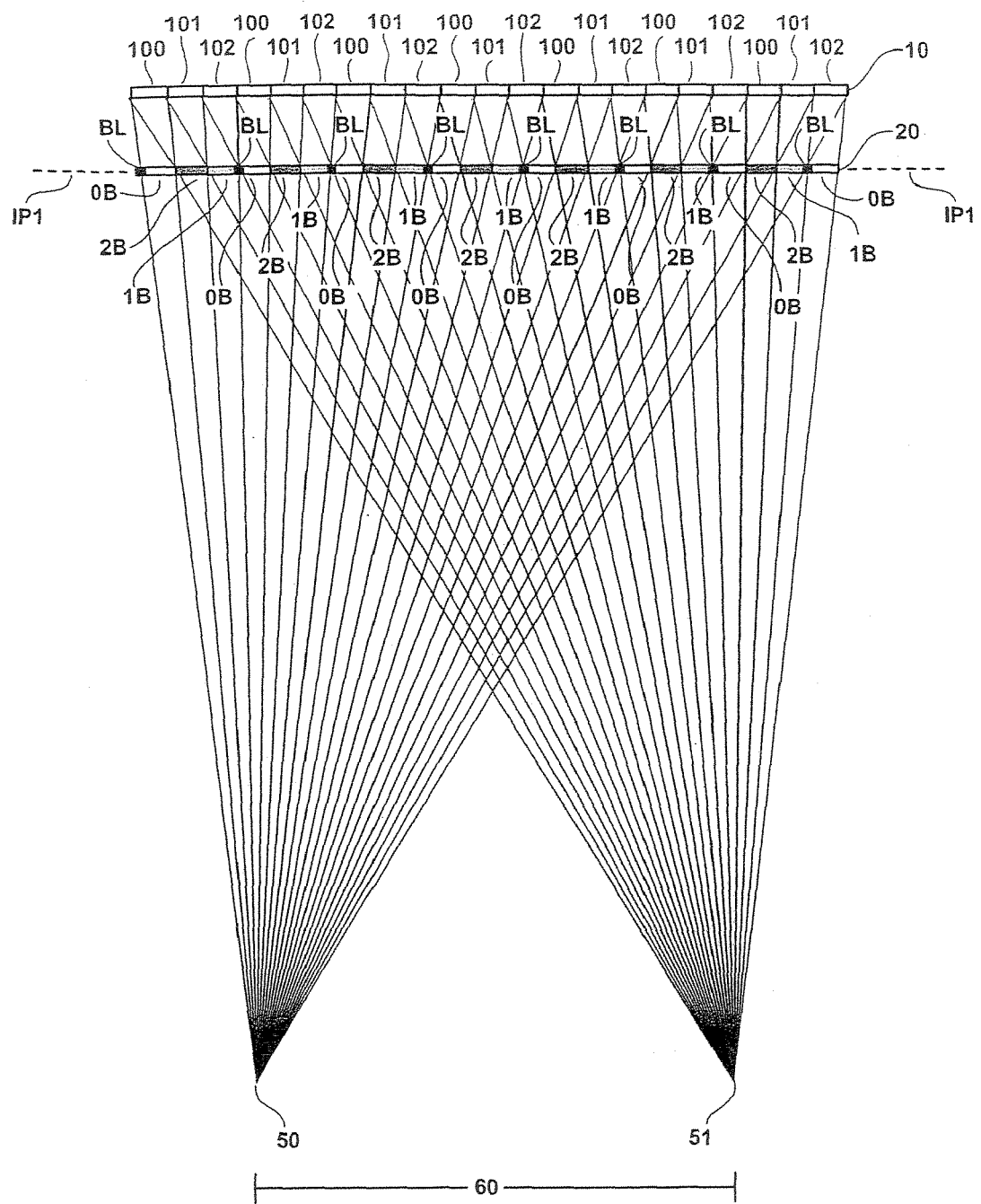
FIG. 8 is a schematic diagram depicting a stereoscopic viewing system similar to that of FIG. 1, incorporating a three-segment, frontal parallax barrier at the first intersection plane, having black separation bars (BL) between the 1B and 0B segments (2B/1B/BL/0B).

FIG. 8 depicts yet another embodiment of the invention, this embodiment incorporating a three-segment parallax barrier with narrow black separation bands (BL) between the 1B and 0B segments (2B/1B/BL/0B). The parallax barrier, otherwise, is identical in function to the one described in connection with FIG. 1. The black separation bands help to minimize crossover of light from one light-filtering region to another. This slightly narrows the sizes of the light-filtering regions 1B and 0B. This same mechanism is commonly used with liquid crystal displays (LCDs), plasma displays, and other flat panel displays. It often is referred to as a "black matrix."

It should also be pointed out that common, monochromatic parallax barriers, as are described and shown in FIG. 3, often include transparent, light-transmitting segments that are slightly narrower than the black, light-blocking segments. This is to avoid "ghosting," a comonly known term in stereoscopy, which refers to light from the left image reaching the right eye, and light from the right image reaching the left eye.

Figure 9:
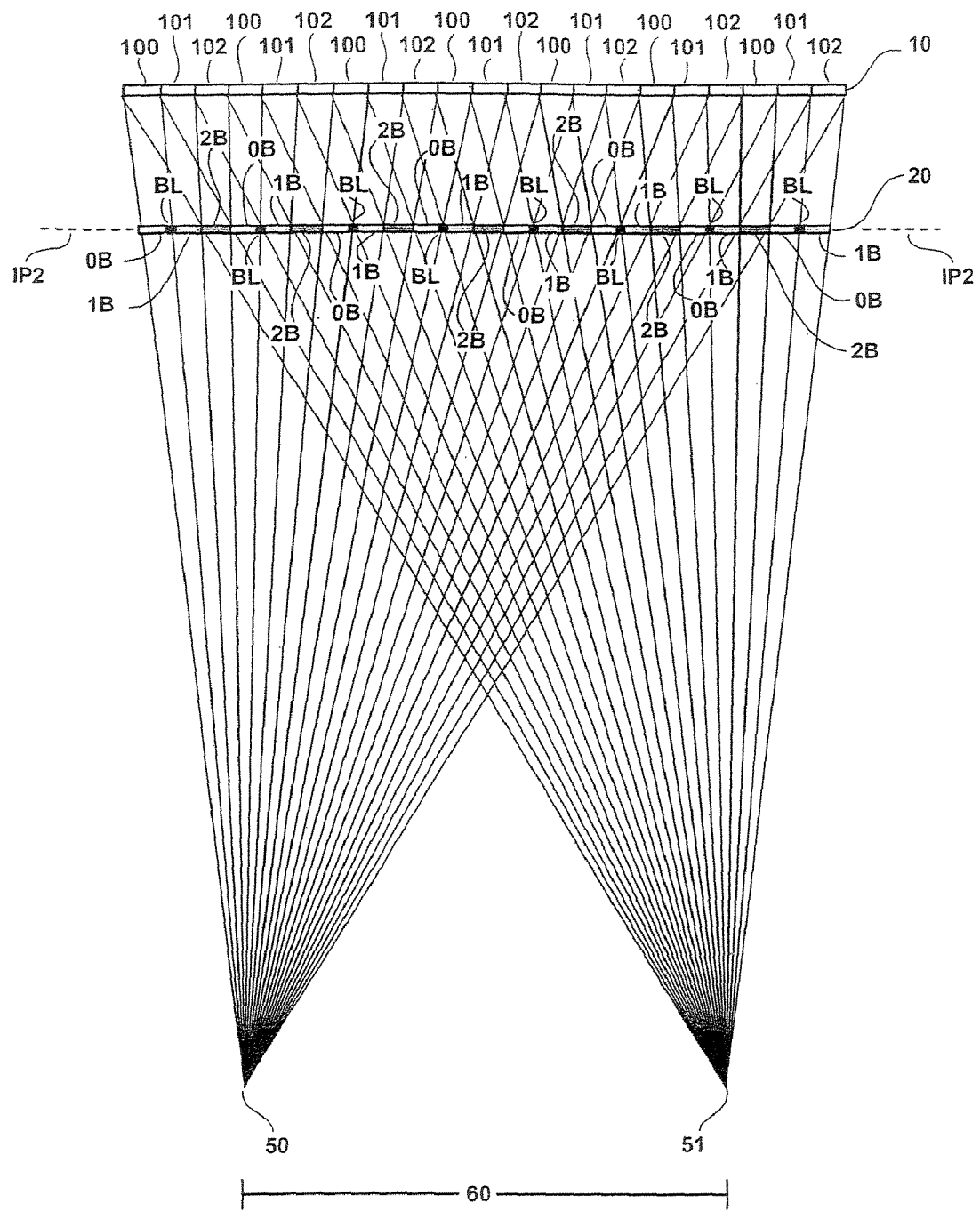
FIG. 9 is a schematic diagram depicting a stereoscopic viewing system similar to that of FIG. 6, incorporating a three-segment, frontal parallax barrier at the second intersection plane, having black separation bars (BL) between the 0B and 1B segments (2B/0B/BL/1B).

FIG. 9 depicts yet another embodiment of the invention, this embodiment incorporating a three-segment parallax barrier having narrow, black separation bands between the 0B and 1B segments (2B/0B/BL/1B). The parallax barrier is located at the second intersection plane 2P. The parallax barrier, otherwise, is identical in function to the one described in connection with FIG. 6. Again, the separation bands function to minimize ghosting caused by the crossover of light from one light-filtering region to another.

Figure 10:
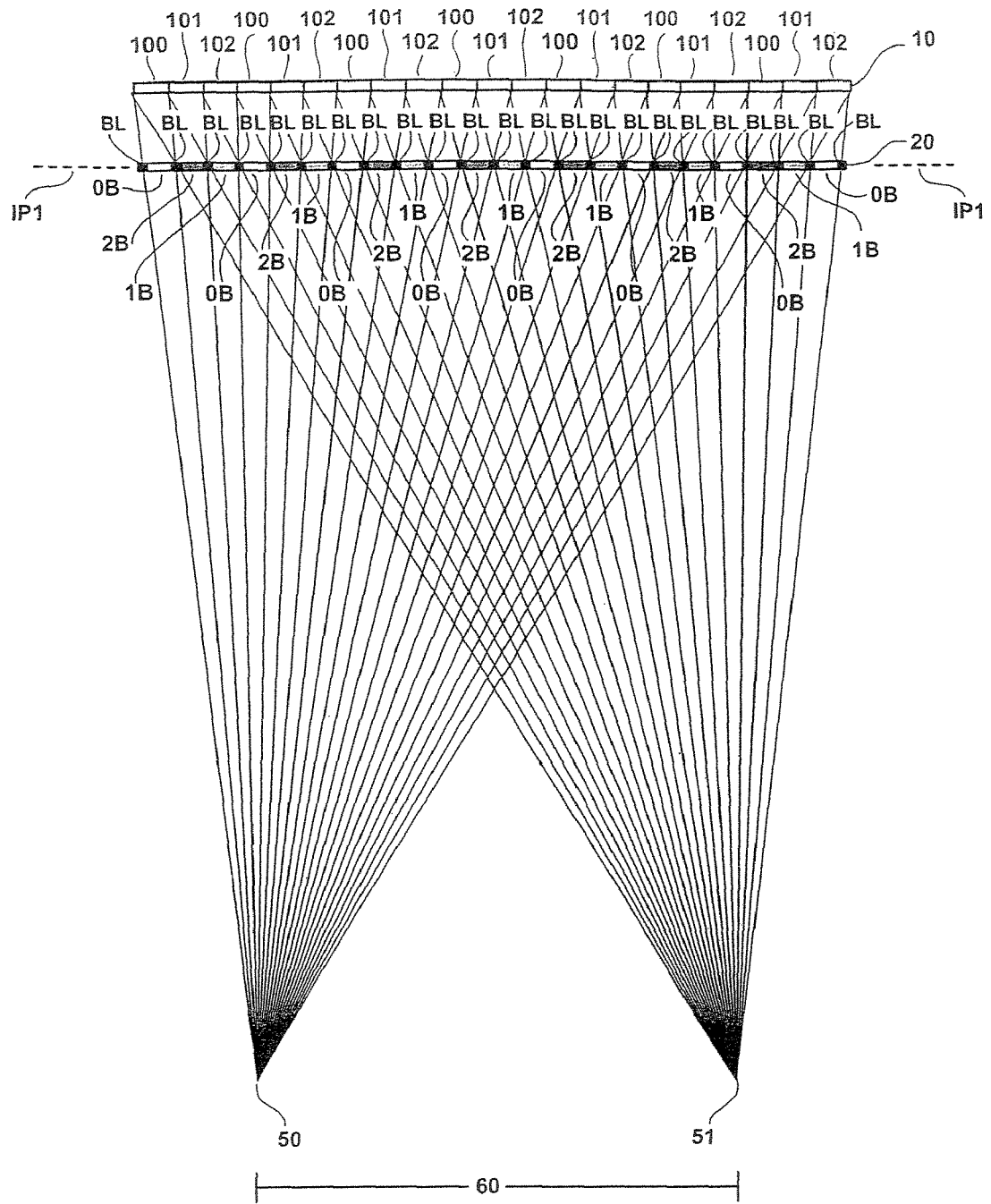
FIG. 10 is a schematic diagram depicting a stereoscopic viewing system incorporating a three-segment, frontal parallax barrier at the first intersection plane, having black separation bars between every segment (2B/BL/1B/BL/0B/BL).

FIG. 10 depicts yet another embodiment of the invention, this embodiment incorporating a three-segment parallax barrier having narrow, black separation bands between every segment (2B/BL/1B/BL/0B/BL). The parallax barrier is located at the first intersection plane IP1. Again, the separation bands function to minimize ghosting caused by the crossover of light from one light-filtering region to another.

Figure 12:
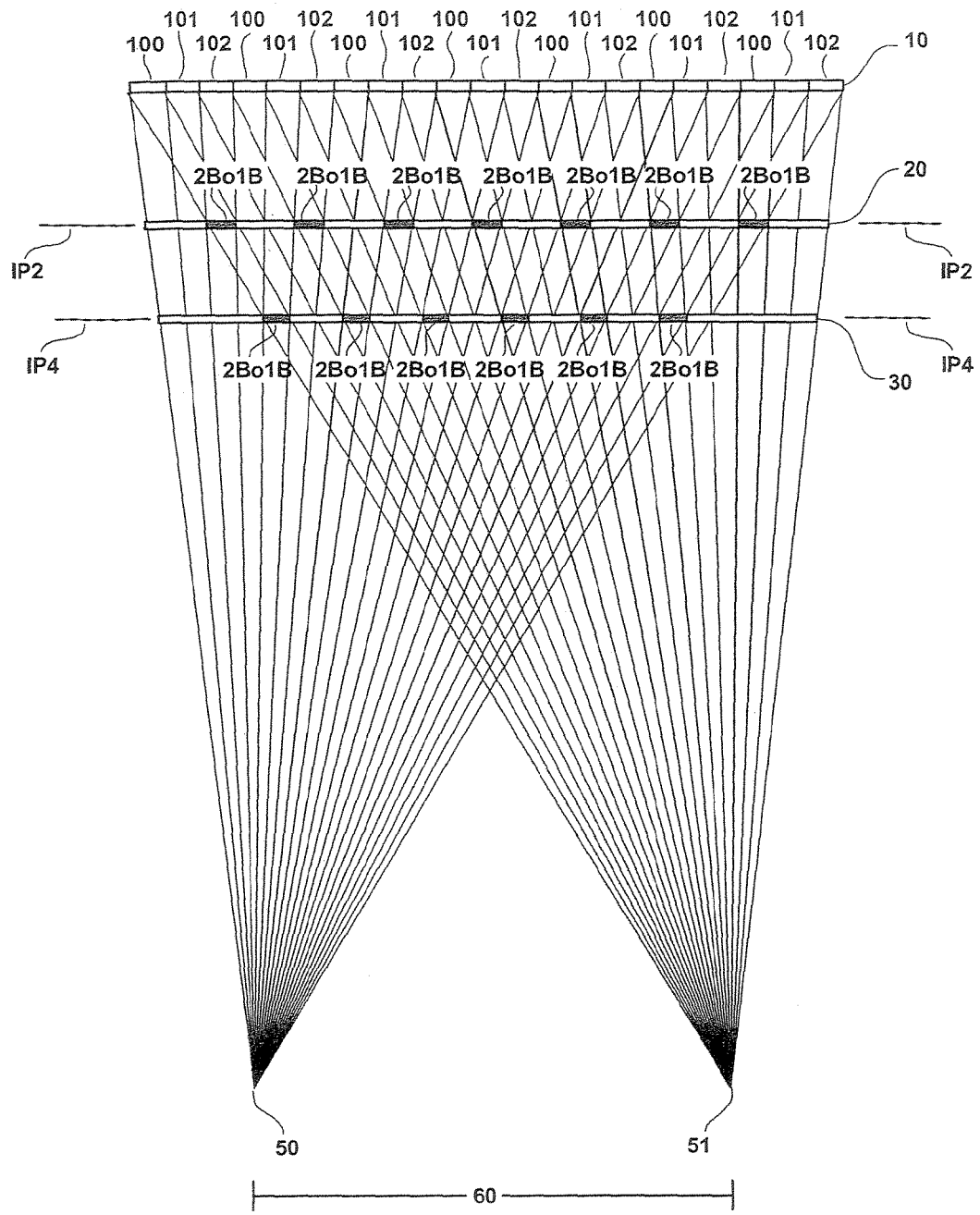
FIG. 12 is a schematic diagram depicting a stereoscopic viewing system incorporating two one-segment, frontal parallax barriers, located at the second and fourth intersection planes (2Bo1B+2Bo1B).

FIG. 12 depicts yet another embodiment of the invention, this embodiment incorporating two separate parallax barriers (2B+(2B or 1B)). This embodiment is similar to the one depicted in FIG. 11, but differs in that its two parallax barriers are located at the second intersection plane IP2 and the fourth intersection plane IP4.

Figure 13:
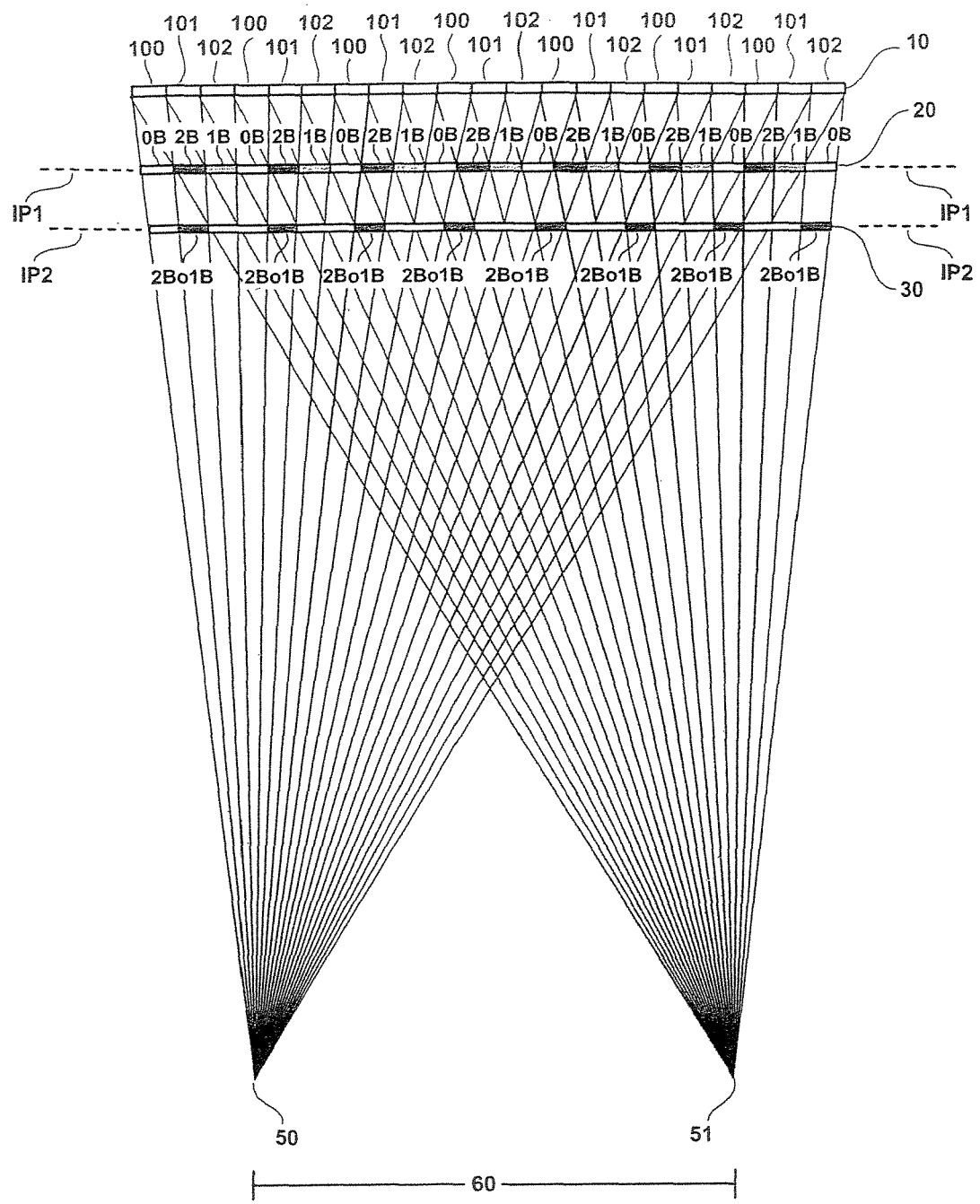
FIG. 13 is a schematic diagram depicting a stereoscopic viewing system incorporating two frontal parallax barriers, including a three-segment parallax barrier at the second intersection plane and a one-segment parallax barrier at the fourth intersection plane (2B/1B/0B+2Bo1B).

FIG. 13 depicts yet another embodiment of the invention, this embodiment incorporating two separate parallax barriers. One parallax barrier includes three segments, and it is located at the first intersection plane IP1 (2B/1B/0B). The other parallax barrier includes just a single segment, and it is located at the second intersection plane (2B or 1B). This is a mixed configuration similar to the embodiment of FIG. 1, but with an added monochromatic parallax barrier at intersection plane IP2. This configuration might be used to selectively increase the blocking of light from one particular pixel color to one eye. For instance, green light can be difficult to block, due at least in part to its brightness, so the second parallax barrier could be used to block green from the left eye.

Basic First Layer Only, Three-Segment Rear Configuration for Traditional Color Anaglyph [Red on Left/Cyan on Right] (2P/0P/1P)

Figure 18:
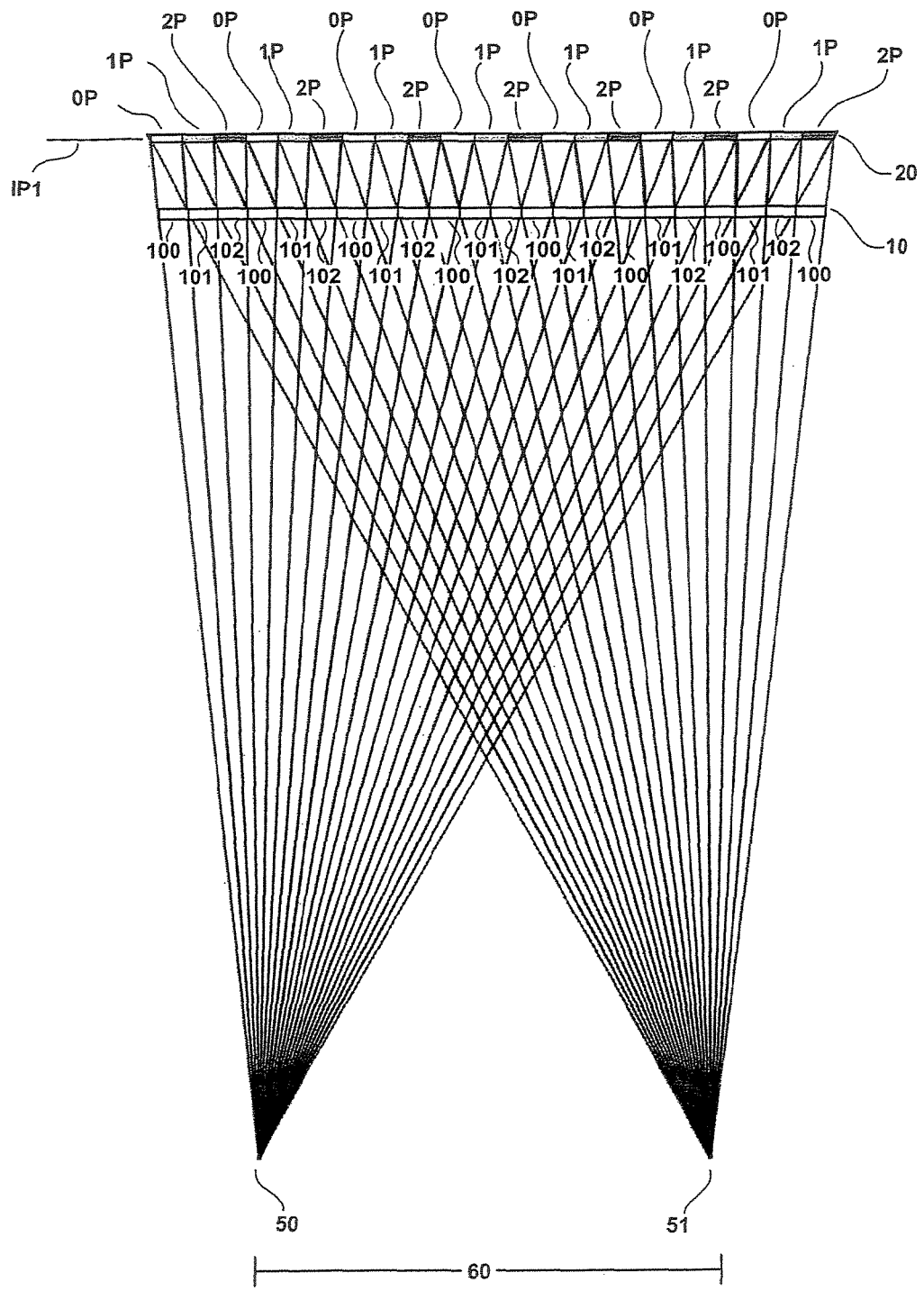
FIG. 18 is a schematic diagram depicting a stereoscopic viewing system incorporating a three-segment, rear parallax barrier at the first rear intersection plane (2P/0P/1P).

With reference now to FIG. 18, there is shown a first embodiment of a rear parallax barrier of this invention, including a display 10 that is divided into a first region 100 including a first set of sub-pixels transmitting light having a first spectral range, a second region 101 including a second set of sub-pixels transmitting light having a second spectral range, and a third region 102 including a third set of sub-pixels transmitting light having a third spectral range. Typically the first, second, and third spectral ranges are red, green, and blue, respectively, in what is commonly known as an RGB display.

Also shown in FIG. 18 is a parallax barrier 20 divided into a first light-filtering region 2P for preventing light from reaching both the sub-pixels 100 and the sub-pixels 102; a second light-filtering region 0P for allowing light to reach both the sub-pixels 100 and the sub-pixels 101; and a third light-filtering region 1P for allowing light to reach the sub-pixels 102 while preventing light from reaching the sub-pixels 101.

The proper placement of the parallax barrier 20 and its light-filtering regions 2P, 0P, and 1P ensures that the viewer's left eye 50 is able to see only the sub-pixels 100 and that the viewer's right eye 51 is able to see only the sub-pixels 101 and sub-pixel 102. Assuming that the viewer is looking at an anaglyphic composite RGB image, as known by those skilled in the art, which displays the left view on the sub-pixels 100 and the right view on the sub-pixels 101 and 102, a vectoring of discrete image information to go to each eye and a perception of depth is attained.

It should be noted that this and many of the various embodiments of the invention assume that the left image is displayed on the sub-pixels 100 and the right image is displayed on the sub-pixels 101 and 102. However, as explained in the discussion of FIG. 15 above in the context of frontal parallax barriers, it also is possible to inverse the placement of the left and right views in the context of rear parallax barriers. In that case, the right image is displayed on the sub-pixels 100 and the left image is displayed on the sub-pixel 101 and 102.

It should also be noted that in the context of the invention the light-filtering regions in the parallax barriers 20 and/or 30 can be rearranged to function in conjunction with any of the three described 1-2 anaglyphic configurations or any of the three described 2-1 anaglyphic configurations, as discussed above in the context of frontal parallax barriers. It should, therefore, be clear that the embodiments depicted in the drawings are exemplary only, and that the scope of the present invention described herein is not limited to the specific details of such examples.

Equation (15) can be used to calculate the distance between display 10 and the parallax barrier 20, at intersection plane IP2, as described above with respect to the embodiment of FIG. 18. Similarly, equation (10) can be used to calculate the barrier pitch, which corresponds to the widths of the light-filtering regions 2P, 0P, and 1P. It should be pointed out that the widths of the three light-filtering regions are identical for this particular embodiment of the invention. Again, as shown in FIG. 18, and as reflected in equation (10), the geometry of the parallax barrier 20 is dependent on the distance from the display 10 to the viewer and on the distance between the viewer's eyes 50, 51.

For a concrete example of one possible implementation of this embodiment of the invention, and with reference to FIG. 18, it is assumed that the sub-pixels 100 transmit light in the red spectral range, the sub-pixels 101 transmit light in the green spectral range, and the sub-pixels 102 transmit light in the blue spectral range. This represents the standard pixel configuration of a common RGB display.

It is also assumed that the viewer is observing an anaglyphic composite RGB image, in which the left view has been encoded in the red channel and the right view has been encoded in the green and blue (i.e., cyan) channel. As is well known to those skilled in the art, the described red/cyan anaglyph configuration has evolved into the most popular anaglyph encoding method, and it represents a large majority of anaglyphic imagery published to date. Thus, it is deemed a real-world example of anaglyphic imagery to be used in the context of the present invention.

Further, and again only for this particular implementation of the embodiment described in FIG. 18, it is assumed that light-filtering regions 2P are black, the light-filtering regions 0P are yellow, and the light-filtering regions 1P are blue. According to commonly accepted theories of additive color synthesis, a blue-colored gel will transmit only blue and will substantially block red or green light. A yellow-colored gel will transmit only green and red and will substantially block only blue. Of course, black will substantially block all three primary colors (red, blue, and green).

As discussed above, a proper placement of the parallax barrier 20 and its light-filtering regions 2P, 0P, and 1P as depicted in FIG. 18, ensures that the viewer's left eye 50 can see only light transmitted through the red sub-pixels 100, emanating from the yellow light-filtering regions 0P, while the blue light-filtering regions IP substantially block light from reaching the green sub-pixels 101 and the black light-filtering regions 0P substantially block light from reaching the blue sub-pixels 102. Similarly, the viewer's right eye 51 can see only light transmitted through the green sub-pixel 101, emanating from the yellow light-filtering region 0P, as well as light transmitted through the blue sub-pixel 102, emanating from the blue light-filtering region IP, while the black light-filtering region 2P substantially blocks light from reaching the red sub-pixel 100.

It should be noted that the choice of black for the light-filtering regions 2P satisfies the definition of 2P, as preventing light from reaching the left eye through the overlying left sub-pixels while concurrently preventing light from reaching the right eye through the overlying right sub-pixels. Further, the choice of yellow for light-filtering regions 1P satisfies the definition of 1 P, as preventing light from reaching the left eye through the overlying left sub-pixels while concurrently permitting light to reach the right eye through the overlying right sub-pixels. Finally, the choice of yellow for the light-filtering regions 0P satisfies the definition of 0P, as permitting light to reach the left eye through the overlying left sub-pixels and concurrently permitting light to reach the right eye through the overlying right sub-pixels.

Since the viewer's left eye 50 sees only the left view encoded in the red channel and the viewer's right eye 51 sees only the right view encoded in the red and blue channel, vectoring of discrete image information to each eye and a perception of depth is attained.

Second Layer Only, Three-Segment Rear Configuration (2P/1P/0P)

Figure 19:
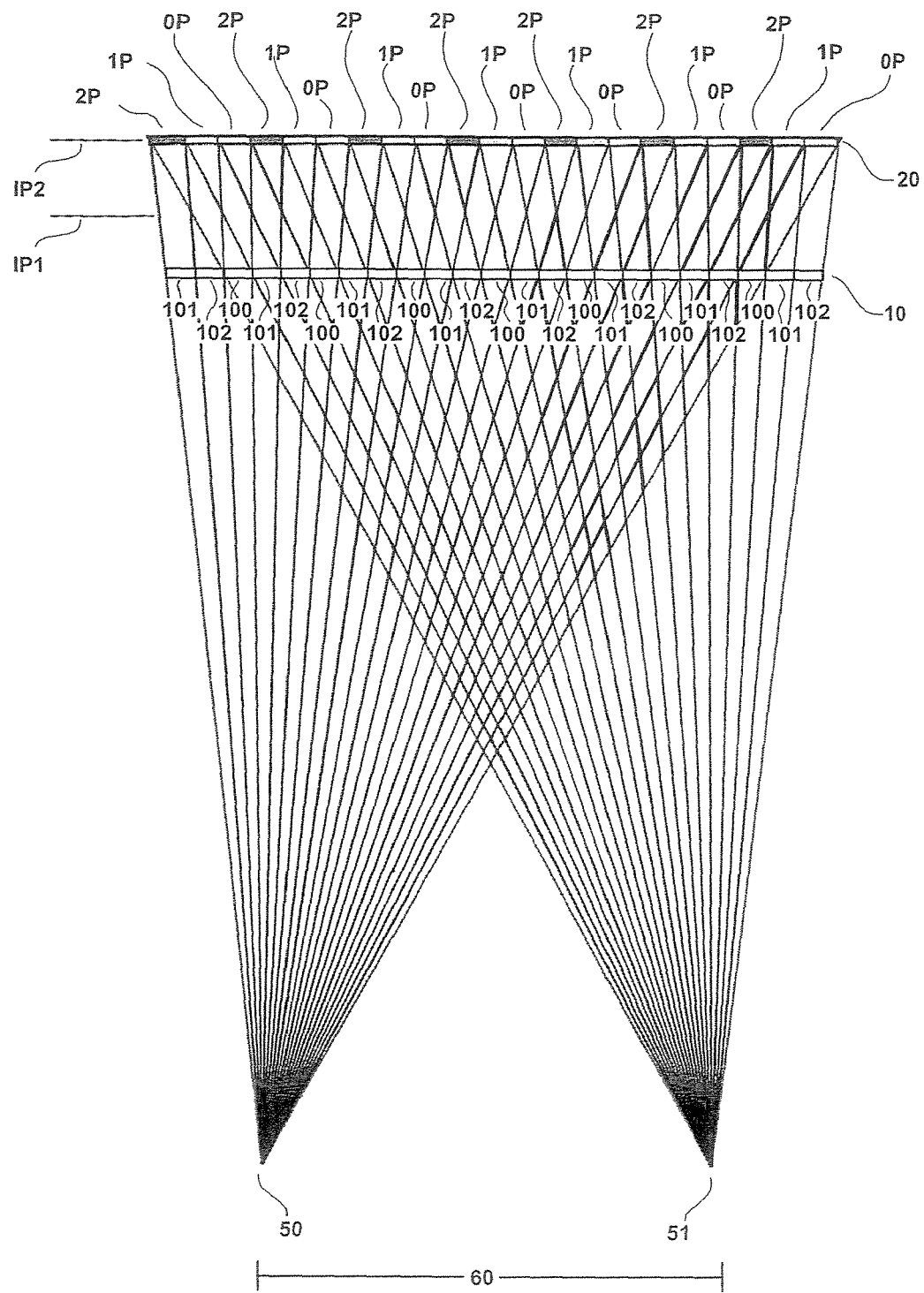
FIG. 19 is a schematic diagram depicting a stereoscopic viewing system incorporating a three-segment, rear parallax barrier at the second rear intersection plane (2P/1P/0P).

With reference now to FIG. 19, there is shown another embodiment of the present invention, in which a rear parallax barrier is placed not at the first rear intersection plane, but rather at an alternative rear intersection plane, while still operating at the same viewing distance between the display 10 and the viewer's eyes 50, 51. For instance, as described above, the combined thickness of the transparent front and rear substrates (not shown in FIG. 19) situated behind the pixels of the display 10 may exceed the distance between the pixels of the display 10 and the first rear intersection plane IP1. Rather than attempt to embed a parallax barrier within the substrate, the embodiment of FIG. 19 instead places the parallax barrier 20 at the second intersection plane IP2. This placement requires a different configuration for the light-filtering regions 2P, 0P, and 1P, as compared to their configuration in the first intersection plane IP1.

As shown in FIG. 19, the rear parallax barrier 20 is divided into first light-filtering regions 2P, for preventing light from reaching both the sub-pixels 101 and the sub-pixels 100; second light-filtering regions 1P, for allowing light to reach the sub-pixels 101 while preventing light from reaching the sub-pixels 102; and third light-filtering regions 0P for allowing light to reach both the sub-pixels 100 and the sub-pixels 102. The proper placement of parallax barrier 20 and its light-filtering regions 2P, 1P, and 0P ensures that the viewer's left eye 50 is able to see only the sub-pixels 100 and that the viewer's right eye 51 is able to see only the sub-pixels 101 and 102.

Equation (15) can be used to calculate the distance between display 10 and the parallax barrier 20, at intersection plane IP2, as described above with respect to the embodiment of FIG. 19. Similarly, equation (10) can be used to calculate the barrier pitch, which corresponds to the widths of the light-filtering regions 2P, 1P, and 0P. It should be pointed out that the widths of the three light-filtering regions are identical for this particular embodiment. Again, as shown in FIG. 19, and as reflected in equation (10), the geometry of the parallax barrier 20 is dependent on the distance from the display 10 to the viewer and on the distance between the viewer's eyes 50, 51.

For a concrete example of this particular embodiment of the invention and with continued reference to FIG. 19, the same sub-pixel configuration is assumed for the display 10 as is described above in connection the other embodiments of the invention. It also is assumed that viewer is observing an anaglyphic composite RGB image, as described above for the previous embodiments. Further, and again only for this particular embodiment of the invention, it is assumed that the light-filtering regions 2P are black, the light-filtering regions 1P are green, and the light-filtering regions 0P are magenta. Further, according to commonly accepted theories of additive color synthesis, a green-colored gel will transmit only green light and will substantially block red and blue light, and a magenta-colored gel will transmit only red and blue light and will substantially block green light. Of course, black will substantially block all three primary colors, i.e., red, blue, and green.

A proper placement of the parallax barrier 20 and its light-filtering regions 2P, 1P, and 0P as depicted in FIG. 19, ensures that the viewer's left eye 50 can see only light transmitted through the red sub-pixels 100, emanating from the magenta light-filtering regions 0P, while the black light-filtering regions 2P substantially block light from reaching the green sub-pixels 101, and the green light-filtering regions 1P substantially block light from reaching the blue sub-pixels 102. Similarly, the viewer's right eye 51 can see only light transmitted through the green sub-pixels 101, emanating from the green light-filtering regions 1P, as well as light transmitted through the blue sub-pixels 102, emanating from the magenta light-filtering region 0P, while the black light-filtering region 2P substantially blocks light from reaching the red sub-pixels 100.

It should be noted that the choice of black for the light-filtering regions 2P satisfies the definition of 2P, as preventing light from reaching the viewer's left eye 50 through the overlying left sub-pixel while concurrently preventing light from reaching the viewer's right eye 51 through the overlying right sub-pixel. Further, the choice of green for the light-filtering region 1P satisfies the definition of 1 P, as preventing light from reaching the left eye through the overlying left sub-pixel whilst concurrently permitting light to reach the right eye through the overlying right sub-pixel. Finally, the choice of magenta for the light-filtering region 0P satisfies the definition of 0P, as permitting light to reach the left eye through the overlying left sub-pixels and concurrently permitting light to reach the right eye through the overlying right sub-pixels.

Since the viewer's left eye 50 sees only the left view encoded in the red channel and the viewer's right eye 51 sees only the right view encoded in the red and blue channel, vectoring of discrete image information to each eye and a perception of depth is attained.

Basic Two-Layer, One-Segment Rear Configuration on First and Second Layers (2Po1P+2Po1P)

Figure 20:
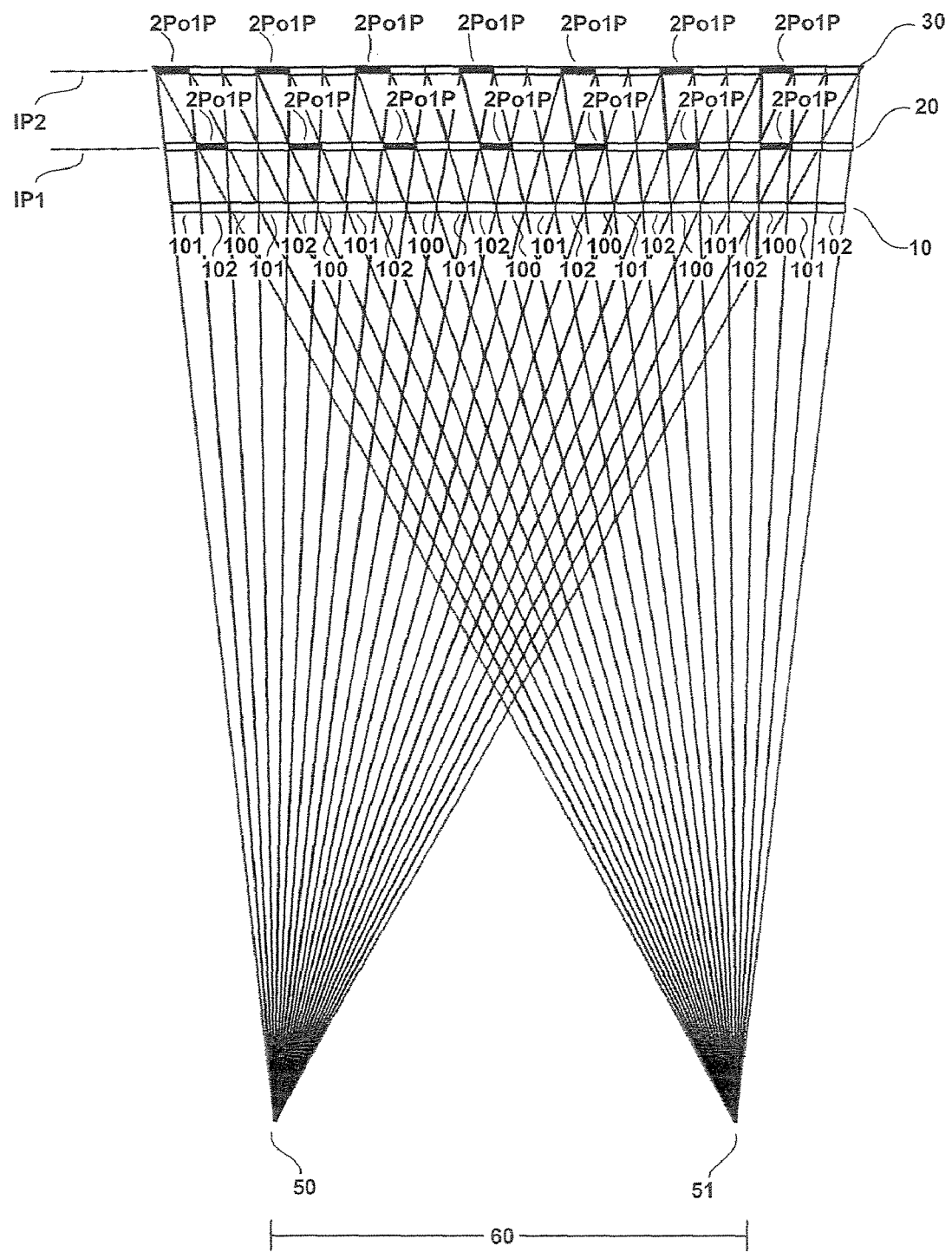
FIG. 20 is a schematic diagram depicting a stereoscopic viewing system incorporating two one-segment, rear parallax barriers located at the first and second rear intersection planes (2Po1P+2Po1P).

With reference now to FIG. 20, there is shown another embodiment of the invention, in which two separate parallax barriers 20 and 30 are included, for anaglyphic auto-stereoscopic viewing. More particularly, the parallax barrier 20 is divided into light-filtering regions 2Po1P, for blocking light from reaching both the sub-pixels 100 and the sub-pixels 102, and the second parallax barrier 30 is divided into light-filtering regions 2Po1P, for blocking light from reaching the sub-pixels 101 and for blocking light from reaching the sub-pixels 100. It should be noted that the two parallax barriers can be located on its own substrate or, alternatively, can be located on the front and back sides of a single substrate.

The proper placement of the parallax barrier 20 and its light-filtering regions 2Po1P ensures that the viewer's left eye 50 cannot see the sub-pixels 102 and that the viewer's right eye 51 cannot see the sub-pixels 100. Similarly, the proper placement of parallax barrier 30 and its light-filtering regions 2Po1P ensures that the viewer's left eye 50 cannot see the sub-pixels 101 and that the viewer's right eye 51 cannot see the sub-pixels 100.

Assuming that the viewer is looking at an anaglyphic composite RGB image that displays the left view on the sub-pixels 100 and the right view on the sub-pixels 101 and 102, a vectoring of discrete image information to go to each eye and a perception of depth is attained.

It will be further appreciated by those skilled in the art that, similar to the other disclosed embodiments, many more variations for composing anaglyphic imagery are possible as long as any one of three sub-pixels displays one view and the remaining two sub-pixels display the second view of an anaglyphic composite RGB image. Thus, it should be clear that the embodiment depicted in FIG. 20 is exemplary only, and that the scope of the invention described herein is not limited to the specific details provided by this example.

Equation (15) can be used to calculate the distance between the display 10 and the parallax barrier 20, at intersection plane IP1, as well as the distance between display 10 and the parallax barrier 30, at intersection plane IP2, as described above. Further, equation (10) can be used to calculate the barrier pitch of the parallax barrier 20, which corresponds to the widths of the light-filtering regions 2Po1P. Similarly, equation (10) can be used to calculate the barrier pitch of the parallax barrier 30, which corresponds to the widths of the light-filtering regions 2Po1P. It should be pointed out that the widths of the three light-filtering regions in the parallax barrier 20 are identical, and that the widths of the three light-filtering regions in the parallax barrier 30 likewise are identical. Again, as shown in FIG. 20 and as reflected in equation (10), the geometries of both the parallax barrier 20 and the parallax barrier 30 are dependent on the distance from the display 10 to the viewer and on the distance between the viewer's eyes 50, 51.

For a concrete example of this embodiment of the invention and with continued reference to FIG. 20, it is assumed that the display 10 has the same sub-pixel configuration as described above for the FIG. 19 embodiment of the invention. It also is assumed that viewer is observing an anaglyphic composite RGB image, as described above. Further, and again only for the embodiment of FIG. 20, it is assumed that light-filtering regions 2Po1P in the parallax barrier 20 and the light-filtering regions 2Po1P in the parallax barrier 30 both are black.

The proper placement of parallax barriers 20 and 30 and their light-filtering regions 2Po1P ensures that the viewer's left eye 50 can see only light transmitted through the red sub-pixels 100, emanating through the gaps between the black light-filtering regions of two parallax barriers. Concurrently, the black light-filtering regions 2Po1P on the parallax barrier 20 substantially block light from reaching the blue sub-pixels 101, and the black light-filtering regions 2Po1P on the parallax barrier 30 substantially block light from reaching the green sub-pixels 102. Similarly, the viewer's right eye 51 can see only light transmitted through the green sub-pixels 101 as well as light transmitted through the blue sub-pixels 102, emanating through the wider gaps between the black light-filtering regions of two parallax barriers, while the black light-filtering regions 2Po1P of the parallax barrier 20 and the black light filtering regions 2Po1P of the parallax barrier 30 substantially block light from reaching the red sub-pixels 100.

It should be noted that the choice of black for the light-filtering regions 2Po1P satisfies the definition of 2Po1P, as blocking the view from the viewer's left eye to the underlying right sub-pixels while concurrently blocking the view from the viewer's right eye to the underlying left sub-pixels. Further, the choice of black for the light-filtering region 2Po1P satisfies the definition of 2Po1P, as blocking the view from the left eye to the underlying right sub-pixels. It should again be noted, for further clarification, that 2Po1P signifies that only one 1P light-filtering region can be used in combination with one 2P light-filtering region on a opposing parallax barrier underlying the very same sub-pixel as described in FIG. 20, and that a 2P light-filtering region may optionally be chosen. It is not possible to use a 1P light-filtering region filtering underlying the same sub-pixel 101. For instance, assuming a yellow 1P light-filtering-region on IP1 opposing a magenta 1P light-filtering region on IP2 would allow red light to be transmitted through both regions and to reach the viewer's right eye 51. For this reason, at least one of the two opposing light-filtering regions underlying the sub-pixels 101 needs to be a 2P light-filtering region, so that the viewer's right eye 51 cannot see the sub-pixels 101.

Since the viewer's left eye 50 sees only the left view encoded in the red channel and the viewer's right eye 51 sees only the right view encoded in the green and blue channel, vectoring of discrete image information to each eye and a perception of depth is attained.

Basic First Layer Only, Three-Segment Rear Reflective Configuration for Traditional Color Anaglyph [Red on Left/Cyan on Right] (2P/0P/1P)

Figure 22:
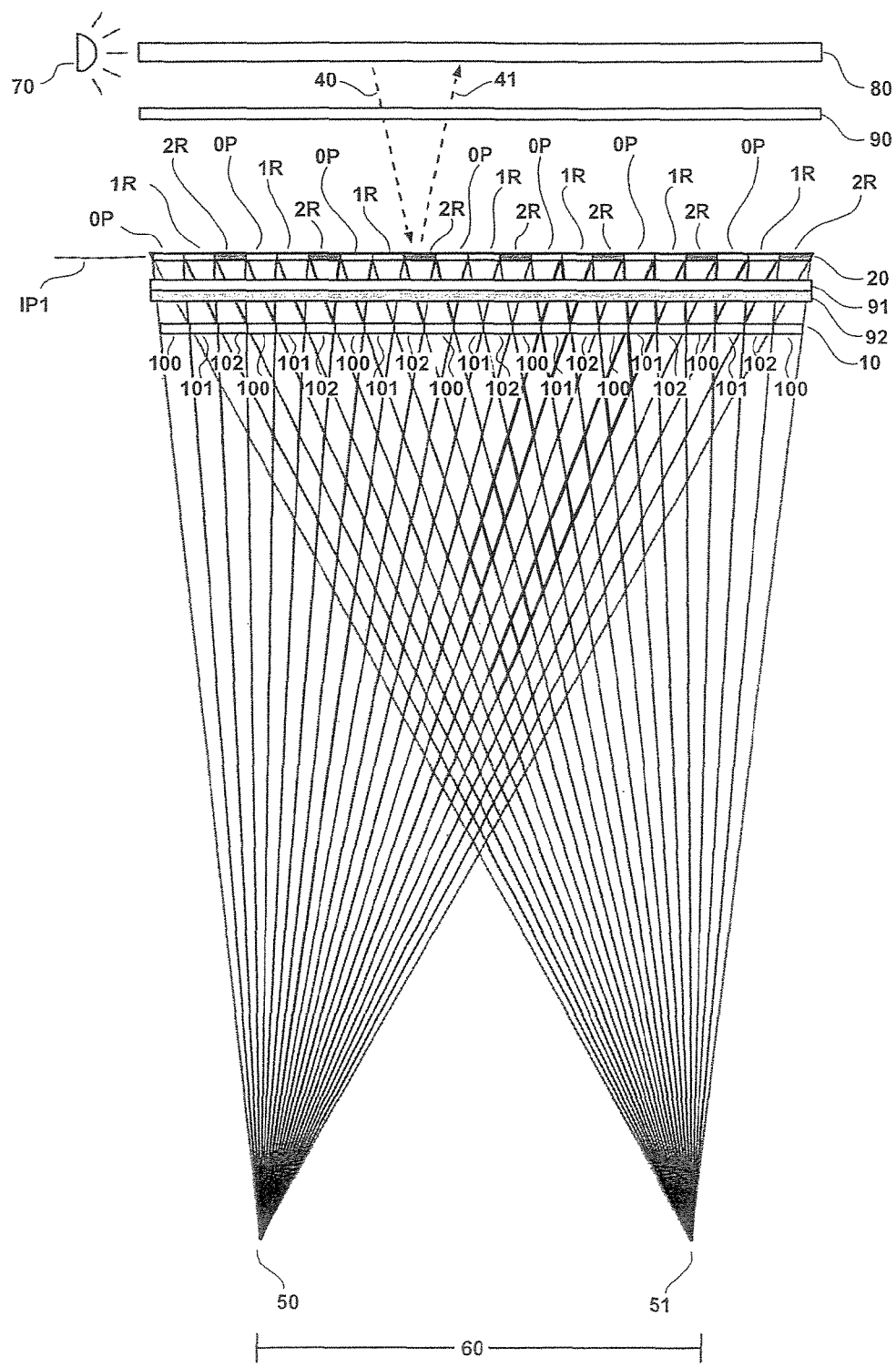
FIG. 22 is a schematic diagram depicting a stereoscopic viewing system incorporating a three-segment, rear parallax barrier at the first rear intersection plane (2R/0P/1R), and with at least one of the three segments concurrently acting as a light-filtering region and as a rear light reflector.

With reference now to FIG. 22, there is shown a first embodiment of a stereoscopic imaging system incorporating a reflective, rear parallax barrier, which is identical in configuration and function to the embodiment shown in FIG. 18, but with the notable differences that regions 2R are substituted for the parallax barrier's regions 2P and that regions 1R are substituted for the regions 1P. As is well known to those skilled in the art, the light source 70 and its light diffuser 80 as shown in FIG. 22 are a common configuration in the construction and manufacturing of backlit-based flat panel displays such as LCDs. Whereas the 2P regions in parallax barrier 20 of FIG. 18 prevent light from reaching the display's sub-pixels 100 and 102 by absorption, the 2R regions in the parallax barrier 20 of FIG. 22 prevent light from reaching the display's sub-pixels 100 and 102 by reflection back toward the light diffuser 80. A portion of the light 41 reflected back toward the light diffuser 80 will again be reflected back toward the display 10, and thereby substantially increase the brightness or light intensity of the sub-pixels 100, 101, and 102.

Also shown in FIG. 22 are a polarizing film 92 and a quarter-wave retardation film 91, which function to absorb any internal reflections traveling between the parallax barrier 20 and the display 10, as described below. Further shown is a quarter-wave retardation film 90, which functions to convert reflected, circularly polarized light traveling from the parallax barrier 20 toward diffuser 80 into linearly polarized light, and to convert linearly polarized light traveling from the diffuser 80 toward the parallax barrier 20 into circularly polarized light.

As is well known to those skilled in the art, light in the form of a plane wave in space is said to be linearly polarized. Natural light is generally unpolarized, with all planes of propagation being equally probable. A polarizing film is fabricated from a class of materials that absorb light oscillations in one direction but not oscillations oriented in a perpendicular direction. These polarizing materials often contain long particles, rods or plates, aligned parallel to each other in a regular arrangement. These aligned particles transmit one plane of light and absorb the perpendicular plane, thereby producing linearly polarized light. As is also well known to those skilled in the art, a quarter-wave retarder is fabricated from a birefringent material such that the light associated with the larger index of refraction is retarded by 90° in phase (a quarter wavelength) with respect to that associated with the smaller index. Quarter-wave retarders thus function to convert linearly polarized light into circularly polarized light and vice versa.

With continued reference to FIG. 22, unpolarized light emanating from the light source 70 is directed toward the display 10 by the light diffuser 80. Before reaching the display 10, the light first passes through the two quarter-wave retardation films 90 and 91, and in turn through the polarizing film 92. Light passing through the two quarter-wave retardation films 90 and 91 remains unpolarized and, after passing through polarizing film 92, becomes linearly polarized and reaches the display 10. It should be noted that within the scope of this and the following embodiments of reflective, rear parallax barriers of the invention and in the context of an LCD, the angle of alignment between the display 10 and the polarizing film 92 needs to be such that the field component of the linear polarized light traveling toward the display 10 aligns with the transmission orientation of the display's own rear polarizing film (not shown in FIG. 22). This assures that any light passing through the display's own rear polarizing film is transmitted and not absorbed.

As is well known by those skilled in the art, LCDs conventionally require two polarizing filters to function, one located on the back surface of its rear substrate and the other located on the front surface of its front substrate. It should also be noted that, within the scope of this and all following embodiments of stereoscopic imaging systems incorporating reflective, rear parallax barriers and in the context of an LCD, the display's own rear polarizing film can be eliminated, because the presence of the polarizing film 92 assures that light reaching the display already will be linearly polarized.

Depending on the surface properties of the display 10, one possible source of internal light reflection might be light reflected from its rear surface, facing the parallax barrier 20. With continued reference to FIG. 22, such reflected light traveling from the display 10 back toward the parallax barrier 20 is substantially linearly polarized and will first have to pass through the polarization film 92. Since the transmission orientation of the polarizing film 92 and the electric vector of the linearly polarized light traveling through it are aligned with each other, the light is able to pass. The light then passes through the quarter-wave retardation film 91, where it is converted into circularly polarized light.

As is well known to those skilled in the art, circularly polarized light consists of two perpendicular electromagnetic plane waves of equal amplitude and 90° difference in phase. If light is composed of two plane waves of equal amplitude but differing in phase by 90°, then the light is said to be circularly polarized. If the electric vector of the light appears to be rotating clockwise, then the light is said to be right-circularly polarized. Conversely, if the electric vector appears to be rotating counterclockwise, then the light is said to be left-circularly polarized light. Circularly polarized light may be produced by passing linearly polarized light through a quarter-wave retarder at an angle of 45° to the optical axis of the retarder.

After passing through the quarter-wave retardation film 91, there are two possible scenarios, designated A and B. Scenario A is that the now circularly polarized light is reflected back toward the display 10, by either of the light reflecting regions 2R and 1R of the parallax barrier 20. Scenario B is that the circularly polarized light passes through one of the light filtering regions 0P toward the light diffuser 80.

Following is the description of Scenario A: If the circularly polarized light is reflected back toward the display 10 by one of the light reflecting regions 2R and 1R of the parallax barrier 20, its electric vector will flip either from left-circularly polarized to right-circularly polarized or vice versa. In either case, the two original electric vectors of the circularly polarized light will be reversed. The circularly polarized light will then again pass through the quarter-wave retardation film 91, thereby converting it back into linearly polarized light, but having a plane of propagation that is perpendicular relative to its plane before it initially passed through such film. Since the transmission orientation of the polarizing film 92 and the electric vector of the linearly polarized light traveling through it now are perpendicular to each other, the light is not able to pass and is absorbed. Thus, the internal reflection of light has been canceled, preventing undesired ghosting or cross-talk from occurring.

Following is the description of Scenario B: If the circularly polarized light passes through one of the light filtering regions 0P of the parallax barrier 20 toward the light diffuser 80, it will then pass through the quarter-wave retardation film 90, which converts it again into linearly polarized light. A substantial portion of the now linearly polarized light will then be reflected back toward the quarter-wave retardation film 90 by the diffuser 80, while the remaining portion of the light will be scattered. The reflected linearly polarized light will now again pass through the quarter-wave retardation film 90, which converts it back into circularly polarized light. It should be noted that the optical axis of the quarter-wave retardation film 90 has been aligned such that the electric vector of the resulting circularly polarized light rotates in the same direction as before it previously had passed through the quarter-wave retardation film 90. The circularly polarized light will then either pass through parallax barrier 20 or be reflected back again. If it is reflected again, it will travel back and forth between the diffuser 80 and the parallax barrier 20 until it finally is able to pass through parallax barrier 20. However, if the circularly polarized light is able to pass, it will then travel through the quarter-wave retardation film 91, which will convert it back into linearly polarized light. Since the transmission orientation of the polarizing film 92 and the electric vector of the linearly polarized light traveling through it are aligned, the light is able to pass. The linearly polarized light will then reach the display 10 and therefore substantially increase the brightness or light intensity of sub-pixels 100, 101, and 102.

It should be noted that the use of reflective, rear parallax barriers, as for instance is shown in FIG. 22, is compatible with the placement of rear parallax barriers on all possible rear intersection planes as described above. Further, it should be noted that the use of rear parallax barriers that are reflective is independent of the configuration of the light-reflecting regions 2R, 1R and the light-filtering region 0P on the parallax barrier 20. For instance, with reference now to FIG. 19, substituting regions 2R for the regions 2P in the parallax barrier 20, and substituting regions 1R for the regions 1P in the parallax barrier 20, will convert this rear parallax barrier configuration into a reflective rear parallax barrier configuration. Similarly, adding a polarizing film 92 and a quarter-wave retardation film 91 between the display 10 and the parallax barrier 20, and a quarter-retardation film 90 between the parallax barrier 20 and the diffuser 80 as shown in FIG. 22 to the embodiment shown in FIG. 19 will substantially reduce the amount of internal reflections, as described above. Thus, it should be clear that the stereoscopic imaging system depicted in FIG. 22 is exemplary only, and that the scope of the invention described herein is not limited to the specific details provided by this example.

Basic Two-Layer, One-Segment Reflective Rear Configuration on First and Second Layers for Traditional Color Anaglyph [Red on Left/Cyan on Right] (2Po1P+2Po1P)

Figure 23:
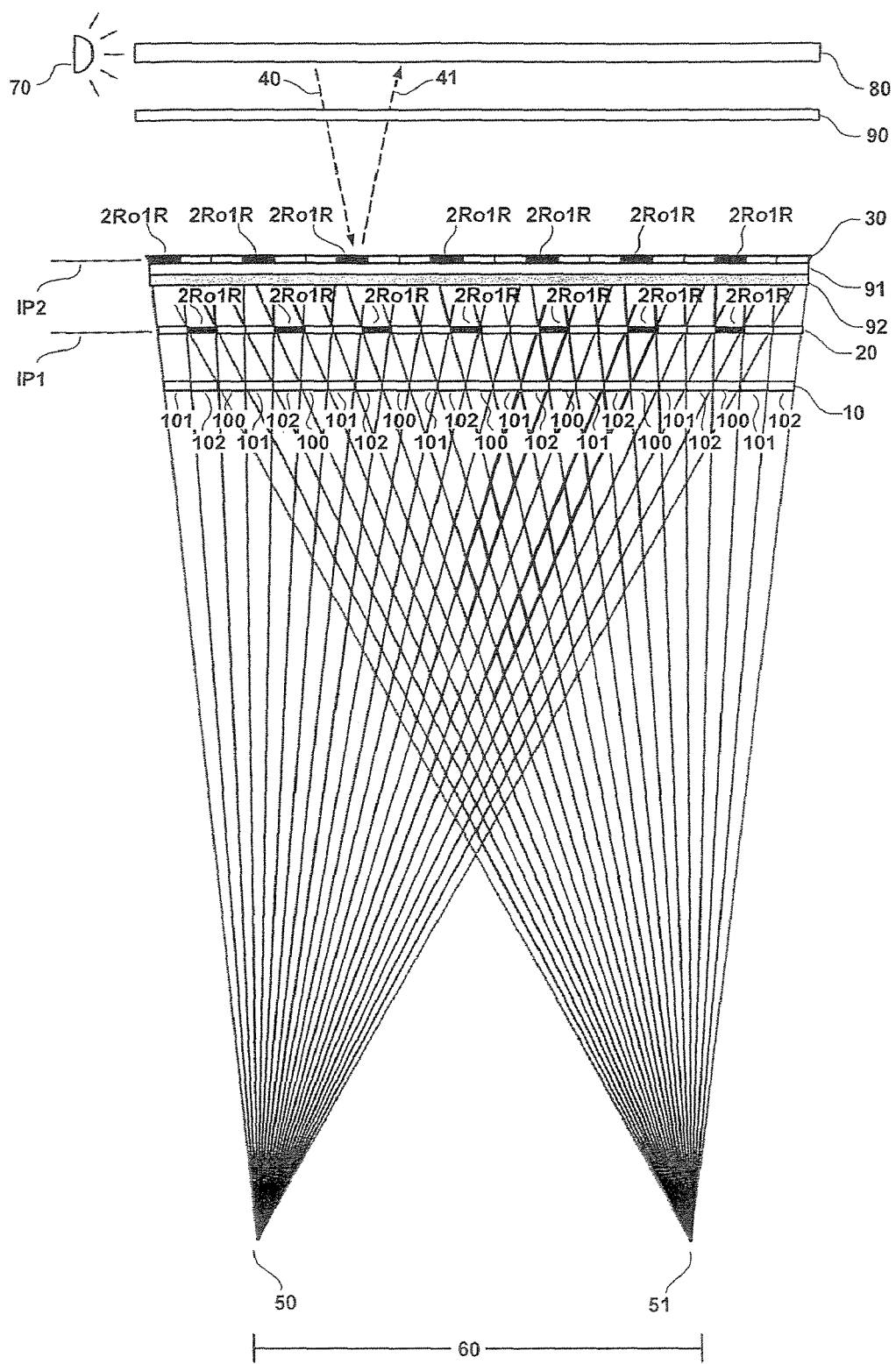
FIG. 23 is a schematic diagram depicting a stereoscopic viewing system incorporating two one-segment, rear parallax barriers located at the first and second rear intersection planes (2Ro1R+2Ro1R), and with the all of the segments concurrently acting as a light filtering region and as a rear light reflector.

With reference now to FIG. 23, there is shown a second embodiment of a reflective, rear parallax barrier, which is identical in configuration and function to the embodiment shown in FIG. 20, with the notable differences that regions 2Ro1R are substituted for the regions 2Po1P in the parallax barriers 20 and 30. Whereas the 2Po1P regions in the parallax barrier 20 of FIG. 20 prevent light from reaching the sub-pixels 100 and 102 by absorption, the 2Ro1R regions in the parallax barrier 20 of FIG. 23 prevent light from reaching the sub-pixels 100 and 102 by substantially reflecting the light back toward the parallax barrier 30 and the light diffuser 80. Light reflected back towards the light diffuser 80 can again be substantially reflected back towards the display 10, and thereby substantially increase the brightness or light intensity of the sub-pixels 100, 101, and 102.

Similarly, the 2Po1P regions in the parallax barrier 30 of FIG. 20 prevents light from reaching the sub-pixels 100 and 101 by absorption, the 2Ro1R regions in the parallax barrier 30 of FIG. 23 prevent light from reaching the sub-pixels 101 and 102 by substantially reflecting the light back toward the light diffuser 80. Again, light reflected back toward the light diffuser 80 can again be substantially reflected back toward the display 10, and thereby substantially increase the brightness or light intensity of the sub-pixels 100, 101, and 102.

Also shown in FIG. 23 are a polarizing film 92 and a quarter-wave retardation film 91, which are placed to absorb any internal reflections traveling between parallax barrier 20 and parallax barrier 30, as described above. Further shown is a quarter-wave retardation film 90, which is placed to convert reflected circularly polarized light traveling from the parallax barrier 30 toward the diffuser 80 into linearly polarized light, and linearly polarized light traveling from the diffuser 80 towards the parallax barrier 30 into circularly polarized light.

Unpolarized light emanating from the light source 70 is directed towards the display 10 by the light diffuser 80. Before reaching the display 10, the light first passes through the two quarter-wave retardation films 90 and 91, and then through the polarizing film 92. Light passing through the two quarter-wave retardation films 90 and 91 remains unpolarized and after passing through polarizing film 92 now becomes linearly polarized and reaches the display 10.

A significant possible source of internal light reflection is light reflected from the rear surface of the parallax barrier 20 facing the parallax barrier 30. With continued reference to FIG. 23, such reflected light traveling from the parallax barrier 20 back toward the parallax barrier 30 is substantially linearly polarized and will first have to pass through the polarization film 92. Since the transmission orientation of the polarizing film 92 and the electric vector of the linearly polarized light traveling through it are aligned, the light is able to pass. The light then passes through the quarter-wave retardation film 91, which converts it into circularly polarized light. After passing through the quarter-wave retardation film 91, there are two possible scenarios, designated A and B. Scenario A is that the now circularly polarized light is reflected back toward the parallax barrier 20 by either of the light reflection regions 2R and 1R of the parallax barrier 30. Scenario B is that the circularly polarized light passes through one of the light filtering regions 0P toward the light diffuser 80.

Following is the description of Scenario A: If the circularly polarized light is reflected back toward the parallax barrier 20 by one of the light reflecting regions 2R and 1R of the parallax barrier 30, its electric vector will flip either from left-circularly polarized to right-circularly polarized or vice versa. In either case, the two original electric vectors of the circularly polarized light will be reversed. The circularly polarized light will then again pass through the quarter-wave retardation film 91, thereby converting it back into linearly polarized light, but having a plane of propagation that is perpendicular relative to its plane before it initially passed through such film. Since the transmission orientation of the polarizing film 92 and the electric vector of the linearly polarized light traveling through it now are perpendicular to each other, the light is not able to pass and is absorbed. Thus, the internal reflection of light has been canceled, preventing undesired ghosting or cross-talk from occurring.

Following is the description of Scenario B: If the circularly polarized light passes through one of the light filtering regions 0P of the parallax barrier 30 toward the light diffuser 80, it will then pass through quarter-wave retardation film 90, which converts it again into linearly polarized light. A substantial portion of the now linearly polarized light will then be reflected back toward the quarter-wave retardation film 90 by the diffuser 80, while the remaining portion of the light will be scattered. The reflected, linearly polarized light will now again pass through the quarter-wave retardation film 90, which converts it back into circularly polarized light. It should be noted that the optical axis of the quarter-wave retardation film 90 is aligned such that the electric vector of the resulting circularly polarized light rotates in the same direction as before it previously had passed through the quarter-wave retardation film 90. The circularly polarized light will then either pass through the parallax barrier 30 or be reflected back again. If it is reflected again, it will travel back and forth between the parallax barrier 30 and the parallax barrier 20 until it finally is able to pass through the parallax barrier 20. However, if the circularly polarized light is able to pass it will then travel through quarter-wave retardation film 91, which will convert it back into linearly polarized light. Since the transmission traveling through it are aligned, the light is able to pass. The linearly polarized light will then reach the display 10 and thereby substantially increase the brightness or light intensity of sub-pixels 100, 101, and 102.

Traditional First Layer Only, Two-Segment Rear Reflective Configuration for Sub-Pixel Shifted 3d Content (2R/0P)

Figure 24:
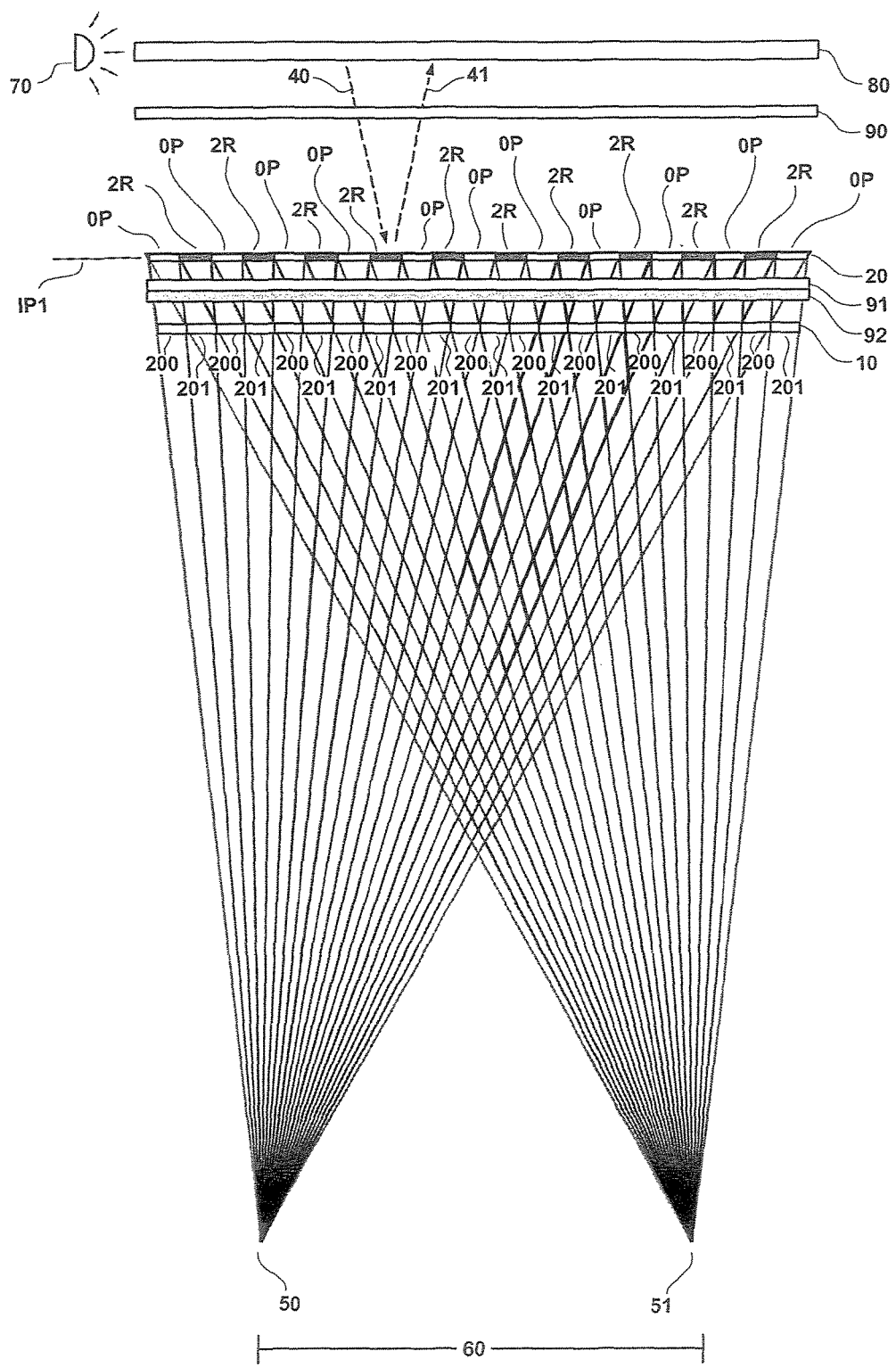
FIG. 24 is a schematic diagram depicting a stereoscopic viewing system incorporating a two-segment, sub-pixel-based, rear parallax barrier at the first rear intersection plane (2R/0P), and with one of the two segments concurrently acting as a light filtering region and as a rear light reflector.

With reference now to FIG. 24, there is shown stereoscopic imaging system incorporating a parallax barrier configuration that operates on the basis of sub-pixel-shifting, meaning that every odd sub-pixel 200 of the display 10 is directed to one eye and every even sub-pixel 201 is directed to the other eye. Content to be shown on such a configuration requires that the left and right views be vertically interlaced, with the first sub-pixel column representing one view and the second sub-pixel column representing the other. Those skilled in the art will recognize this parallax barrier configuration to be a commonly used and to be a popular approach for separating the left view from the right view, in order to produce a vectoring of discrete image information to each eye and to produce a perception of depth. Unlike anaglyphic imagery, sub-pixel-shifted content, also often referred to as "vertically interlaced content" or "interdigitated content," delivers full-color RGB images to both eyes.

FIG. 24 is similar in configuration to FIG. 22, with the exception that the parallax barrier 20 of FIG. 24 includes only light-reflection regions 2R and light-filtering regions 0P, whereas the parallax barrier of FIG. 22 includes light-reflecting regions 2R and 1R and light-filtering regions 0P. However, it is part of the scope of this invention that the method for reflecting light instead of absorbing it remains the same and can be applied to any type of rear parallax barrier configuration. Similarly, the demonstrated method for absorbing internal reflections remains the same for this rear parallax barrier configuration and is considered part of the scope of this invention.

Traditional First Layer Only, Two-Segment Rear Reflective Configuration for Pixel Shifted 3d Content (2R/0P)

Figure 25:
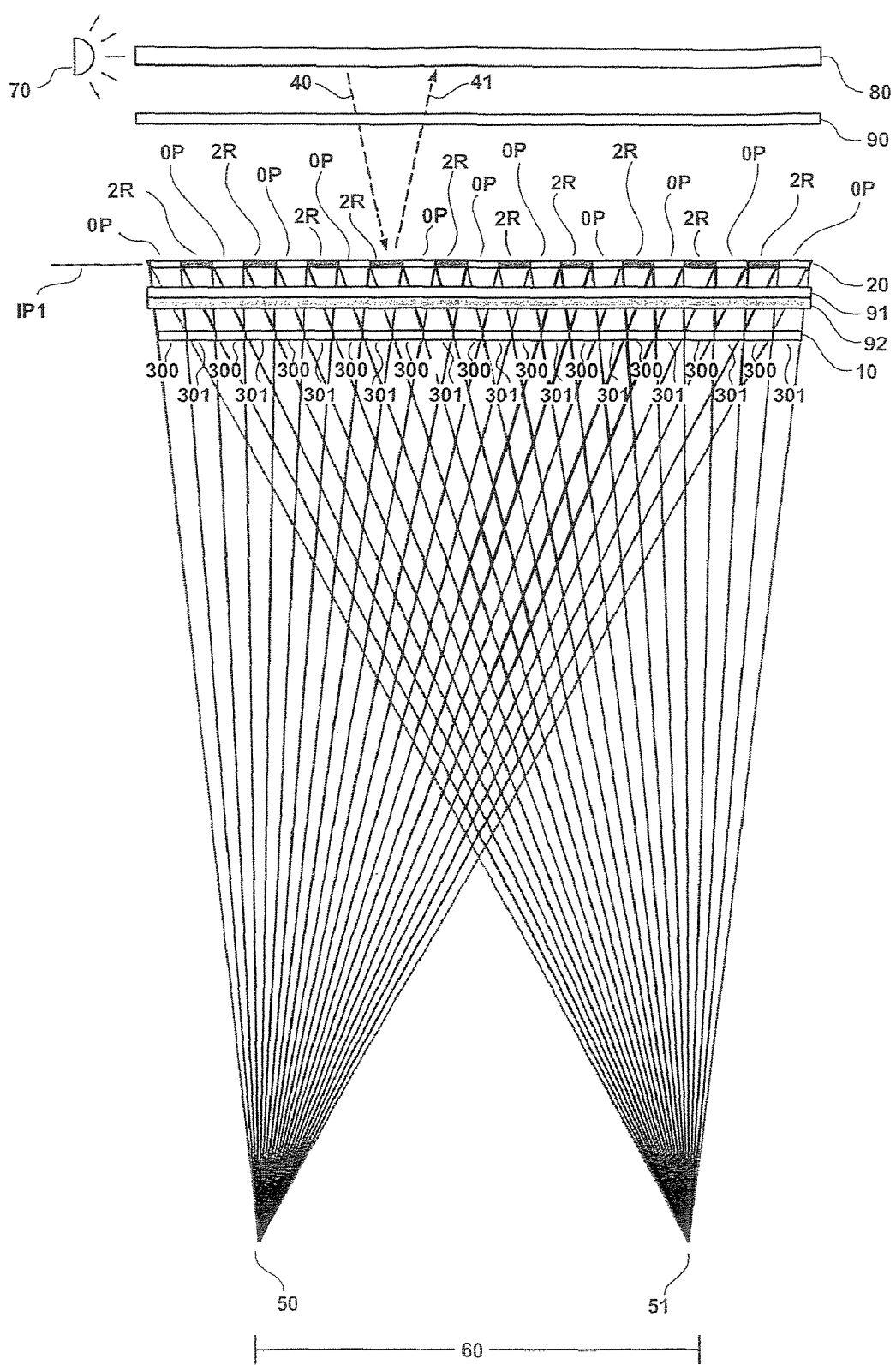
FIG. 25 is a schematic diagram depicting a stereoscopic viewing system incorporating a two-segment, full-pixel-based, rear parallax barrier at the first full-pixel, rear intersection plane (2R/0P), and with one of the two segments concurrently acting as a light-filtering region and as a rear light reflector.

With reference now to FIG. 25, there is shown a stereoscopic imaging system incorporating a parallax barrier configuration that operates on the basis of pixel-shifting, meaning that every odd pixel 300 of the display 10 is directed to one eye and every even pixel 301 is directed to the other eye. This configuration is similar to that of FIG. 24, except that the pixel shifting occurs on a full pixel basis, instead of on a sub-pixel basis. Content to be shown on such a configuration also requires that the left and right views be vertically interlaced, with the first pixel column representing one view and the second pixel column representing the other view. Those skilled in the art will again recognize this parallax barrier configuration to be a commonly used and popular approach for separating the left view from the right view, in order to produce a vectoring of discrete image information to each eye and to produce a perception of depth. Unlike anaglyphic imagery, pixel-shifted content, also often referred to as "vertically interlaced" content or "interdigitated content," delivers full-color RGB images to both eyes.

It is part of the scope of this invention that the method for reflecting light instead of absorbing it remains the same for this embodiment of the invention and can be applied to any type of rear parallax barrier configuration. Similarly, the demonstrated method for absorbing internal reflections remains the same for this rear parallax barrier configuration and is part of the scope of this invention.

The parallax barriers included in the various embodiments of the invention described above can be made by any of a number of suitable techniques known to those skilled in the art. These techniques include, for example, printing using inks containing colored pigments, using dichroic filters, using retarder-based color polarizers in combination with polarizers, and using patterned gels that can be 3-D printed. This printing can be accomplished using submicron inkjet, lithography including nano-imprint lithography, high-resolution screen-printing, patterned deposition of liquid crystals similar to that of an LCD display, polymer-dispersed liquid crystal (PDLC), etc. In the context of using PDLCs, LCs, or any other dual-state-capable technology, it should be mentioned that this would lead to the parallax barrier being completely transparent when in its off mode and activating its light filtering regions when in on mode.

The embodiments incorporating parallax barriers that are monochrome also could be made using patterned polarizers, which would block the desired pixels by means of cancellation. The monochrome two-layer embodiments could also be made using patterned polarizers or patterned retarder/waveplates in combination with polarized light, which would filter respective pixels by means of light cancellation. Again, this could lead to dual-state parallax barriers allowing the polarizer to be activated only when needed.

In most cases, the parallax barriers would include a thin transparent substrate, of thickness about 0.5 mm, with the light-blocking regions printed on one of its surfaces. The parallax barrier preferably would be oriented with its printed surface facing the display. The printed surface preferably would face the display, not the viewer. Alternatively, the parallax barriers might include photographic film in which the actual barrier would be located within the film material, as exposed in the film's emulsion.

It should be appreciated from the foregoing description that the present invention provides an improved apparatus for providing a stereoscopic image for viewing by a viewer, with improved resolution. The apparatus includes a generally planar display comprising a two-dimensional array of uniformly spaced pixels, and it further includes a generally planar parallax barrier having an area substantially coextensive with the display and spaced a prescribed uniform distance from the display. The pixel array includes (1) a first set of sub-pixels controllable to project light in a first spectral color, (2) a second set of sub-pixels controllable to project light in a second spectral color, and (3) a third set of sub-pixels controllable to project light in a third spectral color, and the parallax barrier includes a repeating pattern of vertically oriented regions configured to transmit light to the viewer's first eye along light paths defined from only the first set of sub-pixels and to transmit light to the viewer's second eye along light paths defined from only the second and third sets of sub-pixels.

Although the invention has been disclosed in detail with reference only to the presently preferred embodiments, those skilled in the art will appreciate that various modifications can be made without departing from the invention. Accordingly, the invention is defined only by the following claims.

I claim:

1. A stereoscopic imaging apparatus for providing images from a display for viewing by a first and second eye of a viewer, the display having a two-dimensional array of pixels, such pixels including a first set of sub-pixels controllable to project light in a first spectral color, a second set of sub-pixels controllable to project light in a second spectral color, and a third set of sub-pixels controllable to project light in a third spectral color, the apparatus comprising:

a parallax barrier having an area substantially coextensive with the display and operably positioned a prescribed distance from the display, wherein the parallax barrier includes a first barrier having a repeating pattern of three vertically oriented regions, the regions of the first barrier including first regions configured to transmit light from the first set of sub-pixels to the first eye and to transmit light from the third set of sub-pixels to the second eye;

second regions configured to block transmission of light from the third set of sub-pixels to the first eye and to transmit light from the second set of sub-pixels to the second eye; and third regions configured to block light transmission from the second set of sub-pixels to the first eye and to block light transmission from the first set of sub-pixels to the second eye.

2. The apparatus of claim 1, wherein the vertically oriented regions of the parallax barrier are positioned at least one intersection plane selected from a succession of intersection planes other than those intersection planes whose sequential positions from the display are divisible by three, each intersection plane of the succession of intersection planes being located at a predetermined distance from the display, and wherein the succession of intersection planes are defined where light paths from the first set of sub-pixels of the display cross light paths from the second and third sets of sub-pixels of the display.

3. The apparatus of claim 2, wherein the first barrier is positioned at one of the first intersection plane, the second intersection plane, and the fourth intersection plane.

4. The apparatus of claim 1 wherein the parallax barrier further comprises a second barrier having three vertically oriented regions arranged in a pattern, the regions of the second barrier including
   first regions configured to transmit light from the first set of sub-pixels to the first eye and to transmit light from the second set of sub-pixels to the second eye;
   second regions configured to block light transmission from the second set of sub-pixels to the first eye and to transmit light from the third set of sub-pixels to the second eye; and
   third regions configured to block light transmission from the third set of sub-pixels to the first eye and to block light transmission from the first set of sub-pixels to the second eye.

5. The apparatus of claim 4, wherein a succession of intersection planes, including a first intersection plane and a second intersection plane, are each located at a predetermined distance from the display where light paths from the first set of sub-pixels of the display cross light paths from the second and third sets of sub-pixels of the display; and
   wherein the first barrier is positioned at the first intersection plane and the second barrier is positioned at the second intersection plane.

6. The apparatus of claim 4, wherein a succession of intersection planes, including a second intersection plane and a fourth intersection plane, are each located at a predetermined distance from the display where light paths from the first set of sub-pixels of the display cross light paths from the second and third sets of sub-pixels of the display; and
   wherein the second barrier is positioned at the second intersection plane and the first barrier is positioned at the fourth intersection plane.

7. The apparatus of claim 4, wherein a succession of intersection planes spaced from the display are defined at predetermined distances from the display where light paths of the display's first set of sub-pixels cross light paths of the display's second and third sets of sub-pixels; and
   wherein the vertically oriented regions of the first and second barrier are positioned substantially on two successive intersection planes neither of which have a sequential position from the display divisible by three.

8. The apparatus of claim 1, wherein the parallax barrier further comprises a filter for reducing stray light, the filter having vertically oriented first, second, and third regions, each region configured to block light transmitted from two of the sets of sub-pixels, and
   wherein a succession of intersection planes spaced from the display are defined at predetermined distances from the display where light paths of the display's first set of sub-pixels cross light paths of the display's second and third sets of sub-pixels, and the filter is located at an intersection plane of the succession of intersection planes whose sequential position from the display is divisible by three.

9. The apparatus of claim 1, wherein the first regions, second regions, and third regions are configured to vector red colored image information from the display to the first eye and green colored image information and blue colored image information from the display to the second eye, wherein the first eye is one of a right or a left eye of the viewer and the second eye is the other eye.

10. The apparatus of claim 1, wherein the first regions, second regions, and third regions are configured to vector green colored image information from the display to the first eye and red colored image information and blue colored image information from the display to the second eye, wherein the first eye is one of a right or a left eye of the viewer and the second eye is the other eye.

11. The apparatus of claim 1, wherein the first regions, second regions, and third regions are configured to vector blue colored image information from the display to the first eye and green colored image information and red colored image information from the display to the second eye, wherein the first eye is one of a right or a left eye of the viewer and the second eye is the other eye.

12. The apparatus of claim 1, wherein the parallax barrier further comprises separation bands between at least two regions of the vertically oriented regions, the separation bands configured to block light crossing over from one region to another.

13. The apparatus of claim 1, wherein the vertically oriented regions of each barrier of the parallax barrier are positioned at a distance g from the display as defined by the following equation:

$$g=k((z-k)/e)$$

where k is the pitch factor defined by $k=i \times f$ where i is the sub-pixel pitch of the display and f is the positional factor equal to the number of the intersection plane of the succession of intersection planes at which the barrier is positioned,
z is the optimal viewing distance from the display, and
e is an average separation between the first eye and the second eye of a viewer.

14. An imaging apparatus for providing images to be perceived by a viewer's first eye and second eye, the apparatus comprising:
   a display having a two-dimensional array of pixels, the pixels including a first set of sub-pixels controllable to project light in a first spectral color, a second set of sub-pixels controllable to project light in a second spectral color, and a third set of sub-pixels controllable to project light in a third spectral color;
   a parallax barrier having an area substantially coextensive with the display and positioned over the display, the parallax barrier comprising a first barrier having a repeating pattern of three vertically oriented regions including
   first regions configured to transmit light from the first set of sub-pixels to the first eye and to transmit light from the third set of sub-pixels to the second eye;
   second regions configured to block transmission of light from the third set of sub-pixels to the first eye and to transmit light from the second set of sub-pixels to the second eye; and
   third regions configured to block light transmission from the second set of sub-pixels to the first eye and to block light transmission from the first set of sub-pixels to the second eye.

15. The apparatus of claim 14, wherein the vertically oriented regions of the parallax barrier are positioned at least one intersection plane selected from a succession of intersection planes other than those intersection planes whose sequential positions from the display are divisible by three, each intersection plane of the succession of intersection planes being located a predetermined distance from the display where light paths from the first set of sub-pixels of the display cross and light paths between the second and third sets of sub-pixels of the display.

16. The apparatus of claim 14, wherein the first barrier is positioned at one of a first intersection plane, a second intersection plane, and a fourth intersection plane of the succession of intersection planes.

17. The apparatus of claim 14, wherein the parallax barrier further comprises a second barrier having three vertically oriented regions arranged in a pattern, the regions of the second barrier including
first regions configured to transmit light from the first set of sub-pixels to the first eye and to transmit light from the second set of sub-pixels to the second eye;
second regions configured to block light transmission from the second set of sub-pixels to the first eye and to transmit light from the third set of sub-pixels to the second eye; and
third regions configured to block light transmission from the third set of sub-pixels to the first eye and to block light transmission from the first set of sub-pixels to the second eye.

18. The apparatus of claim 14, wherein a succession of intersection planes, including a first intersection plane and a second intersection plane, are each located at a predetermined distance from the display where light paths from the first set of sub-pixels of the display cross light paths from the second and third sets of sub-pixels of the display; and
wherein the first barrier is positioned at the first intersection plane and the second barrier is positioned at the second intersection plane.

19. The apparatus of claim 14, wherein a succession of intersection planes, including a second intersection plane and a fourth intersection plane, are each located at a predetermined distance from the display where light paths from the first set of sub-pixels of the display cross light paths from the second and third sets of sub-pixels of the display; and
wherein the second barrier is positioned at the second intersection plane and the first barrier is positioned at the fourth intersection plane.

20. The apparatus of claim 14, wherein the vertically oriented regions of each barrier of the parallax barrier are positioned at a distance g from the display as defined by the following equation:

$$g = k((z-k)/e)$$

where k is the pitch factor defined by $k = i \times f$ where i is the sub-pixel pitch of the display and f is the positional factor equal to the number of the intersection plane of the succession of intersection planes at which the barrier is positioned,
z is the optimal viewing distance from the display, and
e is an average separation between the first eye and the second eye of a viewer.

21. The apparatus of claim 20, wherein the display comprises a front substrate located between the sub-pixels of the display and the parallax barrier, and the distance g is defined by the thickness of the front substrate.

22. The apparatus of claim 20, wherein the display comprises a front substrate and a polarizer sheet located between the sub-pixels of the display and the parallax barrier, and the distance g is defined by the combined thickness of the front substrate and the polarizer sheet.

23. The apparatus of claim 14, wherein the display includes a set of red set sub-pixels, a set of green sub-pixels, and a set of blue sub-pixels, and wherein the light-filtering regions of the parallax barrier are configured to provide one of a red/cyan, green/magenta, and blue/yellow anaglyph to a first and second eye of a viewer when light is emitted from the three sets of sub-pixels, wherein the first eye is one of a right or a left eye of the viewer and the second eye is the other eye.

24. An apparatus for providing images from a display to two spatial locations for viewing by a first and second eye of a viewer that are positioned substantially at the two spatial locations, the display having a first set of sub-pixels configured to project light of a first spectral color, a second set of sub-pixels configured to project light of a second spectral color, and a third set of sub-pixels configured to project light of a third spectral color, the apparatus comprising:
a parallax barrier having at least a portion of its area coextensive with the display and configured to be operably positioned a prescribed distance from the display, wherein the parallax barrier comprises a pattern of three regions including
first regions configured to transmit light from the first set of sub-pixels to the first spatial location and to transmit light from the third set of sub-pixels to the second spatial location;
second regions configured to block transmission of light from the third set of sub-pixels to the first spatial location and to transmit light from the second set of sub-pixels to the second spatial location; and
third regions configured to block light transmission from the second set of sub-pixels to the first spatial location and to block light transmission from the first set of sub-pixels to the second spatial location.

* * * * *